(12) United States Patent
Lin et al.

(10) Patent No.: US 10,269,784 B2
(45) Date of Patent: Apr. 23, 2019

(54) INTEGRATED CIRCUIT LAYOUT AND METHOD OF CONFIGURING THE SAME

(71) Applicant: TAIWAN SEMICONDUCTOR MANUFACTURING CO., LTD., Hsinchu (TW)

(72) Inventors: Chung-Te Lin, Tainan (TW); Ting-Wei Chiang, New Taipei (TW); Hui-Zhong Zhuang, Kaohsiung (TW); Pin-Dai Sue, Tainan (TW); Li-Chun Tien, Tainan (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 158 days.

(21) Appl. No.: 15/201,200

(22) Filed: Jul. 1, 2016

(65) Prior Publication Data

US 2018/0006009 A1    Jan. 4, 2018

(51) Int. Cl.
| | |
|---|---|
| *H01L 27/02* | (2006.01) |
| *G06F 17/50* | (2006.01) |
| *H01L 27/088* | (2006.01) |
| *H01L 27/092* | (2006.01) |
| *H01L 27/118* | (2006.01) |

(52) U.S. Cl.
CPC ...... *H01L 27/0207* (2013.01); *G06F 17/5072* (2013.01); *H01L 27/088* (2013.01); *H01L 27/092* (2013.01); *G06F 2217/02* (2013.01); *G06F 2217/12* (2013.01); *H01L 27/0886* (2013.01); *H01L 27/0924* (2013.01); *H01L 2027/11875* (2013.01)

(58) Field of Classification Search
USPC ................................. 716/110, 118, 119, 126
See application file for complete search history.

(56) References Cited

U.S. PATENT DOCUMENTS

| | | | | |
|---|---|---|---|---|
| 8,044,696 | B2 * | 10/2011 | Kim | H03K 5/133 |
| | | | | 327/261 |
| 8,324,668 | B2 | 12/2012 | Huang et al. | |
| 8,759,885 | B1 * | 6/2014 | Jain | H01L 27/11807 |
| | | | | 257/204 |
| 8,772,056 | B2 | 7/2014 | Wang et al. | |
| 8,964,457 | B2 | 2/2015 | Liaw | |
| 9,406,663 | B2 * | 8/2016 | Song | H01L 27/0207 |
| 9,627,376 | B2 | 4/2017 | Song et al. | |
| 2009/0230483 | A1 | 9/2009 | Mizumura et al. | |
| 2010/0237419 | A1 | 9/2010 | Yang et al. | |
| 2011/0198706 | A1 * | 8/2011 | Kwak | H01L 27/0207 |
| | | | | 257/401 |

(Continued)

FOREIGN PATENT DOCUMENTS

| | | |
|---|---|---|
| JP | 5018475 B2 | 9/2012 |
| KR | 1020130116140 A | 10/2013 |

(Continued)

*Primary Examiner* — Brian Ngo
(74) *Attorney, Agent, or Firm* — Slater Matsil, LLP

(57) ABSTRACT

An integrated circuit includes at least one first active region, at least one second active region adjacent to the first active region, and a plurality of third active regions. The first active region and the second active region are staggered. The third active regions are present adjacent to the first active region, wherein the third active regions are substantially aligned with each other.

20 Claims, 21 Drawing Sheets

(56) References Cited

U.S. PATENT DOCUMENTS

| | | | |
|---|---|---|---|
| 2011/0222332 A1* | 9/2011 | Liaw | G11C 11/412 |
| | | | 365/156 |
| 2013/0270652 A1 | 10/2013 | Liaw | |
| 2013/0299917 A1* | 11/2013 | Yang | H01L 27/0207 |
| | | | 257/401 |
| 2014/0077303 A1 | 3/2014 | Baek | |
| 2014/0103482 A1* | 4/2014 | Kim | H01L 29/66795 |
| | | | 257/499 |
| 2014/0327087 A1 | 11/2014 | Kim et al. | |
| 2015/0035016 A1 | 2/2015 | Ganz | |
| 2015/0171215 A1* | 6/2015 | Han | H01L 27/0207 |
| | | | 365/208 |
| 2016/0163721 A1* | 6/2016 | Yao | H01L 27/115 |
| | | | 257/321 |
| 2016/0284712 A1* | 9/2016 | Liaw | H01L 27/1104 |

FOREIGN PATENT DOCUMENTS

| | | |
|---|---|---|
| KR | 1020140036446 A | 3/2014 |
| KR | 1020140070325 A | 6/2014 |
| TW | 201123419 A | 7/2011 |
| TW | 201511279 A | 3/2015 |
| WO | 2006090445 A1 | 7/2008 |

\* cited by examiner

INTEGRATED CIRCUIT LAYOUT AND METHOD OF CONFIGURING THE SAME

BACKGROUND

The semiconductor integrated circuit (IC) industry has experienced exponential growth. Technological advances in IC materials and design have produced generations of ICs where each generation has smaller and more complex circuits than the previous generation.

The smaller feature size is the use of multigate devices such as fin field effect transistor (FinFET) devices. FinFETs are so called because a gate is present on and around a "fin" that extends from the substrate. FinFET devices may allow for shrinking the gate width of device while providing a gate on the sides and/or top of the fin including the channel region.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
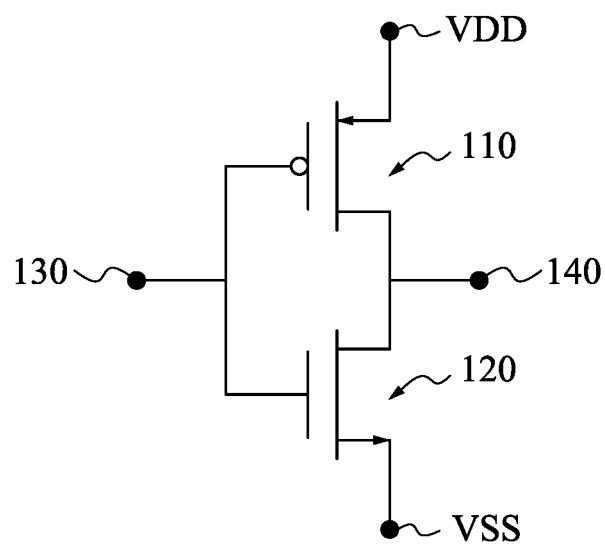
FIG. 1 is a schematic diagram of an inverter according some embodiments of the disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are present in direct contact, and may also include embodiments in which additional features may be present between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 250 degrees or at other orientations) and the spatially relative descriptors used herein may likewise be interpreted accordingly.

Reference is made to FIG. 1, which is a schematic diagram of an inverter 100 according to some embodiments of the present disclosure. The inverter 100 includes a PMOS (P-channel metal oxide semiconductor) transistor 110 and an NMOS (N-channel metal oxide semiconductor) transistor 120. An input port 130 of the inverter 100 is electrically connected to gate terminals of the PMOS transistor 110 and the NMOS transistor 120. An output port 140 of the inverter 100 is electrically connected to drain terminals of the PMOS transistor 110 and the NMOS transistor 120.

When the input port 130 is set to "0" (for example, ground voltage), the PMOS transistor 110 is turned on, and the NMOS transistor 120 is turned off. In such a situation, current flows from VDD (voltage drain drain) through the PMOS transistor 110 to the output port 140. When the input port 130 is set to "1" (for example, operation voltage), the PMOS transistor 110 is turned off, and the NMOS transistor 120 is turned on. In such a situation, current flows from the output port 140 through the NMOS transistor 120 to VSS (voltage source source).

Figure 2A:
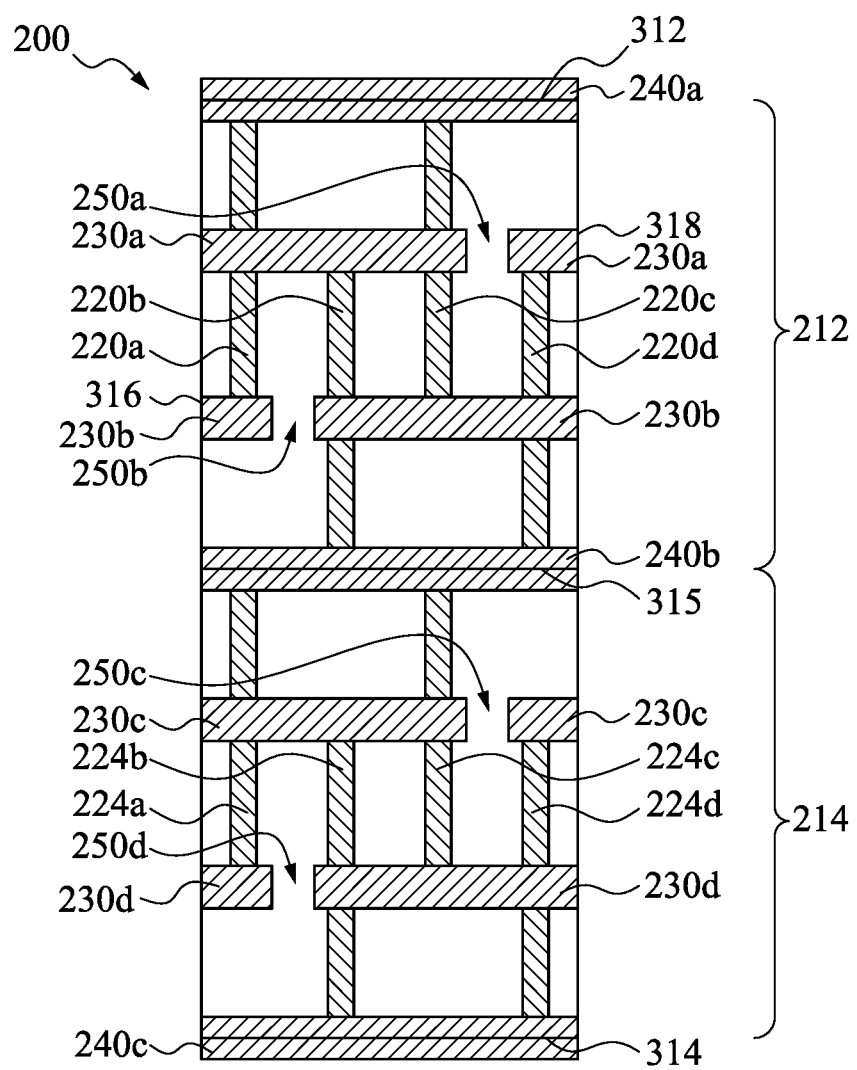
FIG. 2A is a top view of a cell layout according to some embodiments of the disclosure.

Reference is made to FIG. 2A, which is a top view of a cell layout according to some embodiments of the present disclosure. The cell 200 is present on a semiconductor substrate. The cell 200 has a cell boundary including a top edge 312, a bottom edge 314, and opposite side edges 316 and 318. A cell height is defined between the top edge 312 and the bottom edge 314. A cell width is defined between the opposite side edges 316 and 318.

The cell 200 includes a first transistor region 212 and a second transistor region 214, in which the second transistor region 214 is arranged vertically next to the first transistor region 212. A common boundary line 315 separates the first transistor region 212 and the second transistor region 214. The first transistor region 212 of the cell 200 can be arranged to form PMOS transistors and can be regarded as a PMOS region 212. The second transistor region 214 of the cell 200 can be arranged to form NMOS transistors and can be regarded as an NMOS region 214.

A plurality of P-type active regions 220a-220d are present in the PMOS region 212, and a plurality of N-type active regions 224a-224d are present in the NMOS region 214. In some embodiments, an active region, such as the P-type active regions 220a-220d and the N-type active regions 224a-224d, is also referred to herein as OD (oxide-dimensioned region). The P-type active regions 220a-220d are substantially perpendicular to the top edge 312. The P-type active regions 220a-220d are arranged substantially parallel to each other and are substantially equally spaced apart. The N-type active regions 224a-224d are substantially perpendicular to the bottom edge 314. The N-type active regions 224a-224d are arranged substantially parallel to each other and are substantially equally spaced apart. In some embodiments, the P-type active regions 220a-220d and the N-type active regions 224a-224d are fin shaped, and the P-type active regions 220a-220d and the N-type active regions 224a-224d are staggered in a one-by-one configuration, in which each of the active regions, such as the P-type active regions 220a-220d and the N-type active regions 224a-224d, is staggered with the active region or regions adjacent thereto.

Gate electrodes 230a-230d and dummy gate electrodes 240a-240c are present over the semiconductor substrate. In FIG. 2A, the gate electrodes 230a-230d and the dummy gate electrodes 240a-240c are substantially parallel to each other and are substantially parallel to the top edge 312 and the bottom edge 314. The gate electrodes 230a-230d and the dummy gate electrodes 240a-240c are formed of polysilicon or other conductive materials, such as metals, metal alloys and metal silicides. The dummy gate electrodes 240a-240c are arranged to not act as a gate to any transistor. In some embodiments, gate electrodes and dummy gate electrodes, such as the gate electrodes 230a-230d and the dummy gate electrodes 240a-240c, are also referred to herein as PO. In some embodiments, the dummy gate electrodes 240a-240c are also referred to herein as PODE (poly on OD edge). In some embodiments, the active regions 220a-220d and 224a-224d are fin type in shape and, together with the corresponding gate electrodes 230a-230d, form respective FinFET transistors.

The gate electrodes 230a and 230b are present in the PMOS region 212. The gate electrodes 230c and 230d are present in the NMOS region 214. The cell 200 further includes a plurality of cutting patterns 250a-250d, such as cut polysilicon (CPO) patterns, for respectively separating the gate electrodes 230a-230d. The cutting patterns 250a-250d respectively represent cut sections or patterning areas where the gate electrodes 230a-230d are removed.

The cutting pattern 250a separates the gate electrode 230a into two parts. One part of the gate electrode 230a crosses the P-type active regions 220a and 220c and is partially present on an edge of the P-type active region 220b, in which said part of the gate electrode 230a is regarded as a dummy gate electrode to the P-type active region 220b. The other part of the gate electrode 230a is partially present on an edge of the P-type active region 220d and is regarded as a dummy gate electrode to the P-type active region 220d.

The cutting pattern 250b separates the gate electrode 230b into two parts. One part of the gate electrode 230b crosses the P-type active regions 220b and 220d and is partially present on an edge of the P-type active region 220c, in which said part of the gate electrode 230b is regarded as a dummy gate electrode to the P-type active region 220c. The other part of the gate electrode 230b is partially present on an edge of the P-type active region 220a and is regarded as a dummy gate electrode to the P-type active region 220a.

The cutting pattern 250c separates the gate electrode 230c into two parts. One part of the gate electrode 230c crosses the N-type active regions 224a and 224c and is partially present on an edge of the N-type active region 224b, in which said part of the gate electrode 230c is regarded as a dummy gate electrode to the N-type active region 224b. The other part of the gate electrode 230c is partially present on an edge of the N-type active region 224d and is regarded as a dummy gate electrode to the N-type active region 224d.

The cutting pattern 250d separates the gate electrode 230d into two parts. One part of the gate electrode 230d crosses the N-type active regions 224b and 224d and is partially present on an edge of the N-type active region 224c, in which said part of the gate electrode 230d is regarded as a dummy gate electrode to the N-type active region 224c. The other part of the gate electrode 230d is partially present on an edge of the N-type active region 224a and is regarded as a dummy gate electrode to the N-type active region 224a.

In some embodiments, the dummy gate electrode 240a is present on the top edge 312, the dummy gate electrode 240b is present on the common boundary line 315, and the dummy gate electrode 240c is present on the bottom edge 314. The gate electrodes 230a and 230b are present between the dummy gate electrodes 240a and 240b, in which the gate electrode 230a is present between the dummy gate electrode 240a and the gate electrode 230b, and the gate electrode 230b is present between the gate electrode 230a and the dummy gate electrode 240b. The gate electrodes 230c and 230d are present between the dummy gate electrodes 240b and 240c, in which the gate electrode 230c is present between the dummy gate electrode 240b and the gate electrode 230d, and the gate electrode 230d is present between the gate electrode 230c and the dummy gate electrode 240c.

In some embodiments, the P-type active regions 220a-220d are staggered in the PMOS region 212, and the N-type active regions 224a-224d are staggered in the NMOS region 214. As shown in FIG. 2A, the P-type active regions 220a and 220c are partially covered by the dummy gate electrode 240a while being spaced from the dummy gate electrode 240b. The P-type active regions 220b and 220d are partially covered by the dummy gate electrode 240b while being spaced from the dummy gate electrode 240a. The N-type active regions 224a and 224c are partially covered by the dummy gate electrode 240b while being spaced from the dummy gate electrode 240c. The N-type active regions 224b and 224d are partially covered by the dummy gate electrode 240c while being spaced from the dummy gate electrode 240b.

Figure 2B:
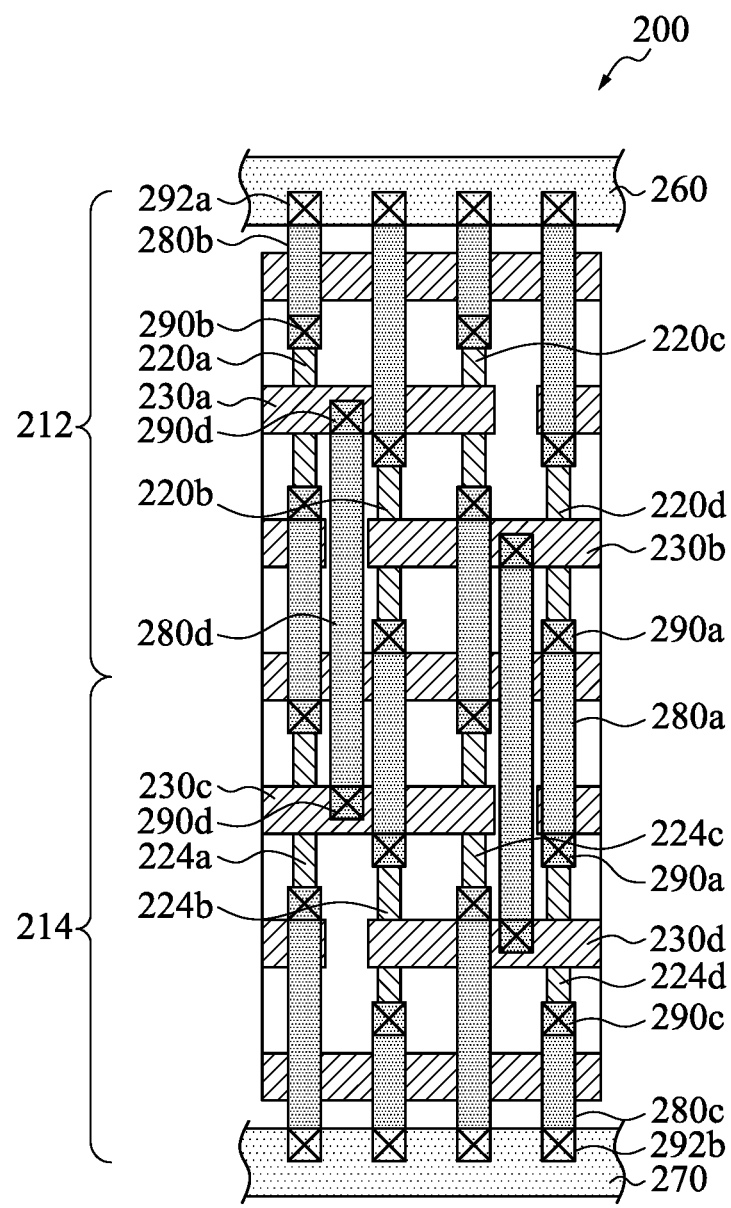
FIG. 2B is top view of an integrated circuit layout using the cell of FIG. 2A according to some embodiments of the disclosure.

Reference is made to FIG. 2B, which is a top view of an integrated circuit layout using the cell 200 of FIG. 2A according to some embodiments of the present disclosure. In some embodiments, the cell 200 is arranged to form two inverters. One of the inverters includes the P-type active regions 220a and 220c, the N-type active regions 224a and 224c, and the gate electrodes 230a and 230c, and the other inverter includes the P-type active regions 220b and 220d, the N-type active regions 224b and 224d, and the gate electrodes 230b and 230d.

In some embodiments, the P-type active regions 220a-220d and the corresponding N-type active regions 224a-224d are respectively interconnected through conductive metal one lines 280a and conductive via zeros 290a. For example, the P-type active region 220d is connected to the N-type active region 224d through the conductive metal one line 280a and the conductive via zeros 290a. Output ports of the inverters are respectively on or electrically connected to the conductive metal one lines 280a. For simplicity, only one conductive metal one line 280a and two conductive via zeros 290a are labelled.

A VDD power supply line 260 and a VSS ground line 270 are implemented, for example, in metal two lines. In a top-down sequence, the VDD power supply line 260 is connected through conductive via ones 292a, conductive metal one lines 280b, and conductive via zeros 290b to each of source regions of the P-type active regions 220a-220d. For simplicity, only one conductive metal one line 280b, one conductive via one 292a, and one conductive via zero 290b are labelled.

Similarly, the VSS ground line 270 is connected through conductive via ones 292b, conductive metal one lines 280c, and conductive via zeros 290c to each of source regions of the N-type active regions 224a-224d. For simplicity, only one conductive metal one line 280c, one conductive via one 292b, and one conductive via zero 290c are labelled.

Furthermore, the gate electrodes 230a and 230b in the PMOS region 212 are respectively connected to the gate electrodes 230c and 230d in the NMOS region 214 through conductive metal one lines 280d and conductive via zeros 290d. For example, the gate electrode 230a is connected to the gate electrode 230c through the conductive metal one line 280d and the conductive via zeros 290d. Input ports of the inverters are respectively on or electrically connected to the conductive metal one lines 280d. For simplicity, only one conductive metal one line 280d and two conductive via zeros 290d are labelled.

Figure 3:
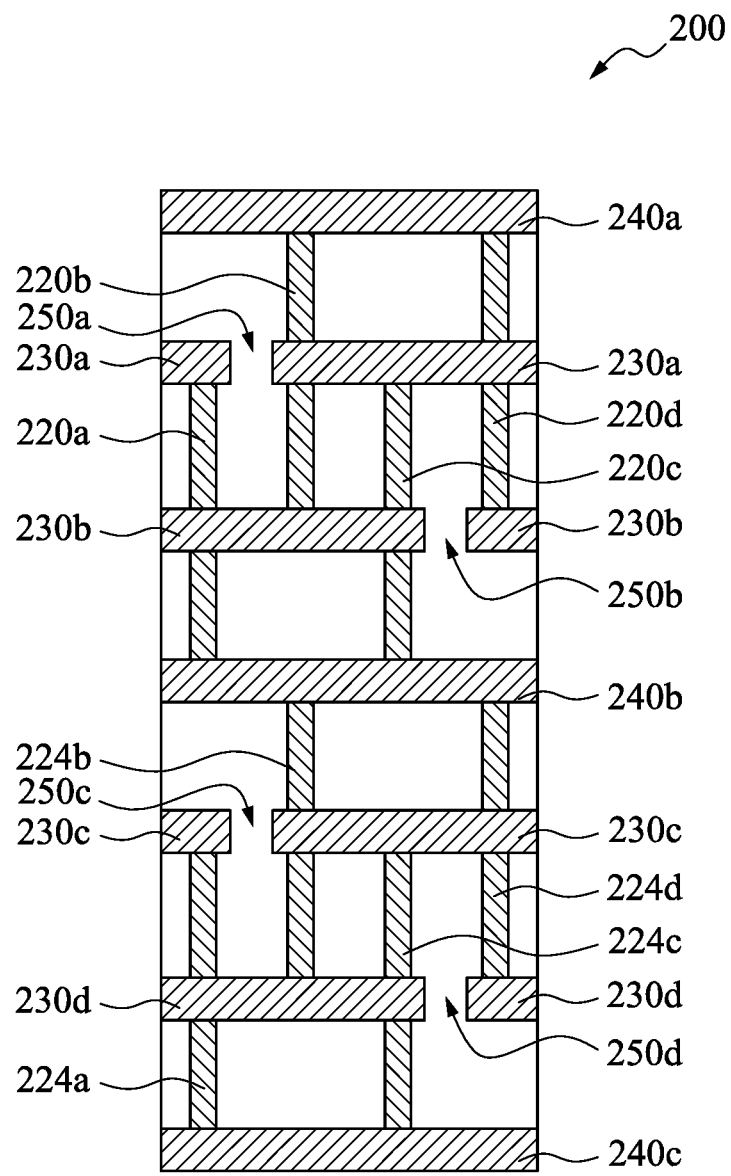
FIG. 3 and FIG. 4 are top views of cell layouts according to some embodiments of the disclosure.

FIG. 3 is a top view of a cell layout according to some embodiments of the present disclosure. The difference between FIG. 3 and FIG. 2A includes the arrangement of the P-type active regions 220a-220d, the N-type active regions 224a-224d, and the cutting patterns 250a-250d. Referring to FIG. 3, the P-type active regions 220b and 220d are partially covered by the dummy gate electrode 240a while being spaced from the dummy gate electrode 240b. The P-type active regions 220a and 220c are partially covered by the dummy gate electrode 240b while being spaced from the dummy gate electrode 240a. The N-type active regions 224b and 224d are partially covered by the dummy gate electrode 240b while being spaced from the dummy gate electrode 240c. The N-type active regions 224a and 224c are partially covered by the dummy gate electrode 240c while being spaced from the dummy gate electrode 240b. The positions of the cutting patterns 250a-250d may be adjusted accordingly. For example, the cutting pattern 250a for separating the gate electrode 230a is present between the P-type active regions 220a and 220b; the cutting pattern 250b for separating the gate electrode 230b is present between the P-type active regions 220c and 220d; the cutting pattern 250c for separating the gate electrode 230c is present between the N-type active regions 224a and 224b; and the cutting pattern 250d for separating the gate electrode 230d is present between the N-type active regions 224c and 224d.

Similarly, the interconnection among the P-type active regions 220a-220d, the N-type active regions 224a-224d, and the gate electrodes 230a-230d may be similar to that shown in FIG. 2B and therefore is not repeated here to avoid duplicity.

Figure 4:
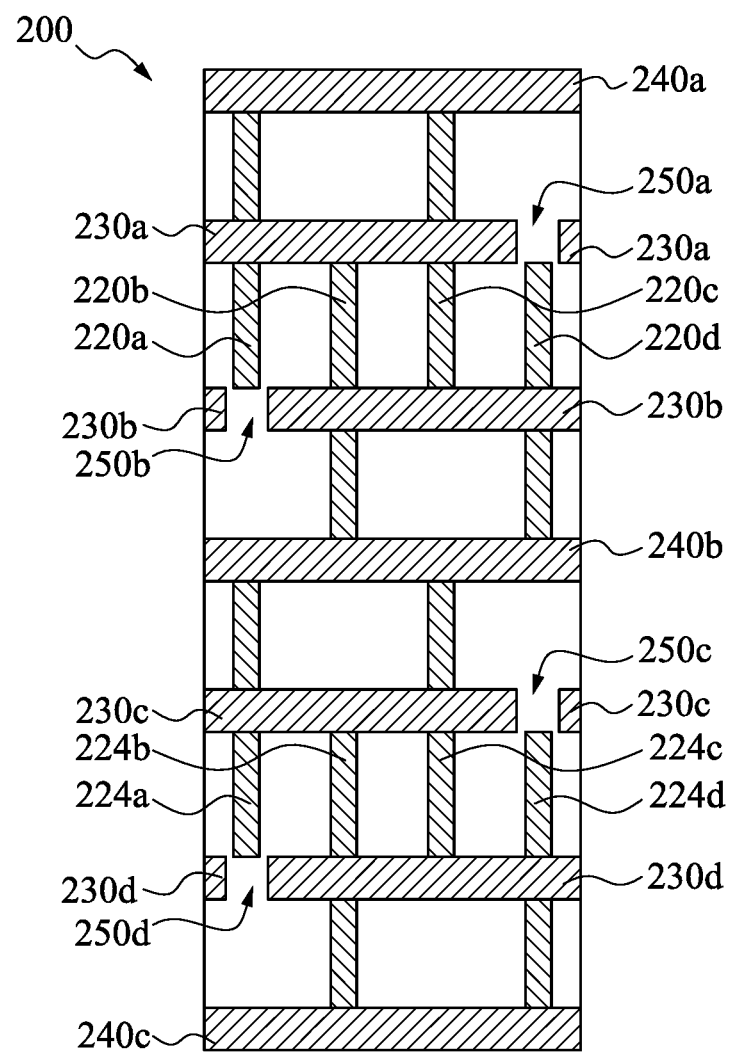

FIG. 4 is a top view of a cell layout according to some embodiments of the present disclosure. The difference between FIG. 4 and FIG. 2A includes the arrangement of the P-type active regions 220a-220d, the N-type active regions 224a-224d, the gate electrodes 230a-230d, and the cutting patterns 250a-250d. In FIG. 4, the edge of each of the P-type active regions 220a and 220c distal to the dummy gate electrode 240a is not covered by the gate electrode 230b; the edge of each of the P-type active regions 220b and 220d distal to the dummy gate electrode 240b is not covered by the gate electrode 230a; the edge of each of the N-type active regions 224a and 224c distal to the dummy gate electrode 240b is not covered by the gate electrode 230d; and the edge of each of the N-type active regions 224b and 224d distal to the dummy gate electrode 240c is not covered by the gate electrode 230c. That is, the cell layout of FIG. 4 represents a non-PODE configuration, in which each of the gate electrodes 230a-230d has no portion arranged to act as a PODE structure. In some embodiments, each or at least one of the cutting patterns 250a-250d in the non-PODE configuration may be substantially aligned with at least one of the active regions 220a-220d and 224a-224d. For example, the cutting pattern 250a may be substantially aligned with the P-type active region 220d; the cutting pattern 250b may be substantially aligned with the P-type active region 220a; the cutting pattern 250c may be substantially aligned with the N-type active region 224d; and the cutting pattern 250d may be substantially aligned with the N-type active region 224a. In some alternative embodiments, the cutting patterns 250a-250d in the non-PODE configuration may be similar to that shown in FIG. 2A as well, in which each or at least one of the cutting patterns 250a-250d is present between adjacent two of the active regions 220a-220d and 224a-224d.

The interconnection among the P-type active regions 220a-220d, the N-type active regions 224a-224d, and the gate electrodes 230a-230d may be similar to that shown in FIG. 2B and therefore is not repeated here to avoid duplicity.

Figure 5A:
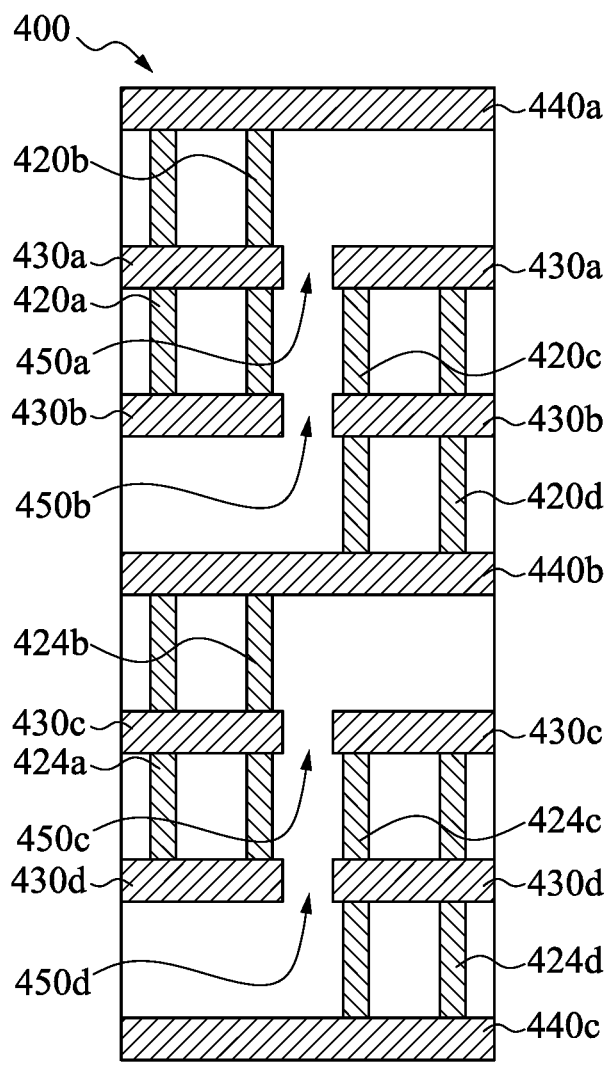
FIG. 5A is a top view of a cell layout according to some embodiments of the disclosure.

FIG. 5A is a top view of a cell layout according to some embodiments of the present disclosure. Unlike the cells 200 having the active regions 220a-220d and 224a-224d staggered in the one-by-one configuration shown in FIGS. 2A, 3 and 4, the active regions 420a-420d and 424a-424d of the cell 400 are staggered in groups, in which the active regions 420a-420d and 424a-424d of each group are substantially aligned with each other, and the active regions 420a-420d and 424a-424d of adjacent groups are not aligned. Referring to FIG. 5A, the P-type active regions 420a and 420b are partially covered by the dummy gate electrode 440a while being spaced from the dummy gate electrode 440b. The P-type active regions 420c and 420d are partially covered by the dummy gate electrode 440b while being spaced from the dummy gate electrode 440a. The N-type active regions 424a and 424b are partially covered by the dummy gate electrode 440b while being spaced from the dummy gate electrode 440c. The N-type active regions 424c and 424d are partially covered by the dummy gate electrode 440c while being spaced from the dummy gate electrode 440b.

The gate electrode 430a is separated by the cutting pattern 450a into two parts. One part of the gate electrode 430a crosses the P-type active regions 420a and 420b. The other part of the gate electrode 430a is partially present on edges of the P-type active regions 420c and 420d and is regarded as a dummy gate electrode to the P-type active regions 420c and 420d. The gate electrode 430b is separated by the cutting pattern 450b into two parts. One part of the gate electrode 430b crosses the P-type active regions 420c and 420d. The other part of the gate electrode 430b is partially present on edges of the P-type active regions 420a and 420b and is regarded as a dummy gate electrode to the P-type active regions 420a and 420b. The gate electrode 430c is separated by the cutting pattern 450c into two parts. One part of the gate electrode 430c crosses the N-type active regions 424a and 424b. The other part of the gate electrode 430c is partially present on edges of the N-type active regions 424c and 424d and is regarded as a dummy gate electrode to the N-type active regions 424c and 424d. The gate electrode 430d is separated by the cutting pattern 450d into two parts. One part of the gate electrode 430d crosses the N-type active regions 424c and 424d. The other part of the gate electrode 430d is partially present on edges of the N-type active regions 424a and 424b and is regarded as a dummy gate electrode to the N-type active regions 424a and 424b.

Figure 5B:
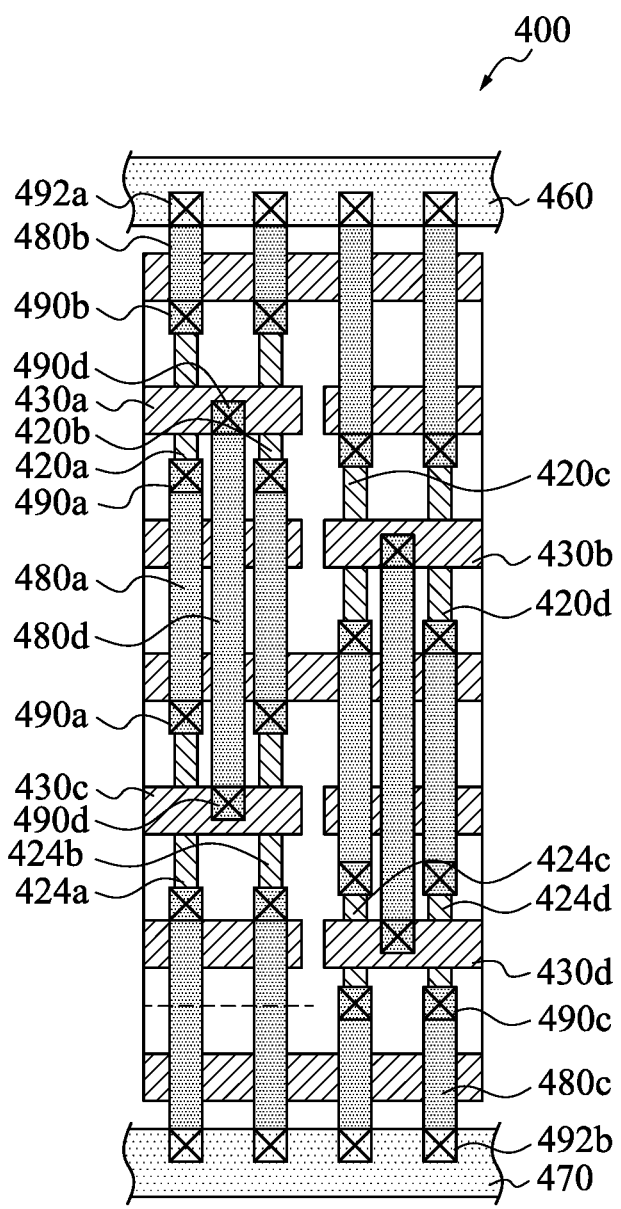
FIG. 5B is top view of an integrated circuit layout using the cell of FIG. 5A according to some embodiments of the disclosure.

Reference is made to FIG. 5B, which is a top view of an integrated circuit layout using the cell 400 of FIG. 5A according to some embodiments of the present disclosure. In some embodiments, the cell 400 is arranged to form two inverters. One of the inverters includes the P-type active regions 420a and 420b, the N-type active regions 424a and 424b, and the gate electrodes 430a and 430c, and the other inverter includes the P-type active regions 420c and 420d, the N-type active regions 424c and 424d, and the gate electrodes 430b and 430d.

In some embodiments, the P-type active regions 420a-420d and the corresponding N-type active regions 424a-424d are respectively interconnected through conductive metal one lines 480a and conductive via zeros 490a. For example, the P-type active region 420a is connected to the N-type active region 424a through the conductive metal one line 480a and the conductive via zeros 490a. Output ports of the inverters are respectively on or electrically connected to the conductive metal one lines 480a. For simplicity, only one conductive metal one line 480a and two conductive via zeros 490a are labelled.

A VDD power supply line 460 and a VSS ground line 470 are implemented, for example, in metal two lines. In a top-down sequence, the VDD power supply line 460 is connected through conductive via ones 492a, conductive metal one lines 480b, and conductive via zeros 490b to each of source regions of the P-type active regions 420a-420d. For simplicity, only one conductive metal one line 480b, one conductive via one 492a, and one conductive via zero 490b are labelled.

The VSS ground line 470 is connected through conductive via ones 492b, conductive metal one lines 480c, and conductive via zeros 490c to each of source regions of the N-type active regions 424a-424d. For simplicity, only one conductive metal one line 480c, one conductive via one 492b, and one conductive via zero 490c are labelled.

Furthermore, the gate electrodes 430a and 430b are respectively connected to the gate electrodes 430c and 430d through conductive metal one lines 480d and conductive via zeros 490d. For example, the gate electrode 430a is connected to the gate electrode 430c through the conductive metal one line 480d and the conductive via zeros 490d. Input ports of the inverters are respectively on or electrically connected to the conductive metal one lines 480d. For simplicity, only one conductive metal one line 480d and two conductive via zeros 490d are labelled.

Figure 6:
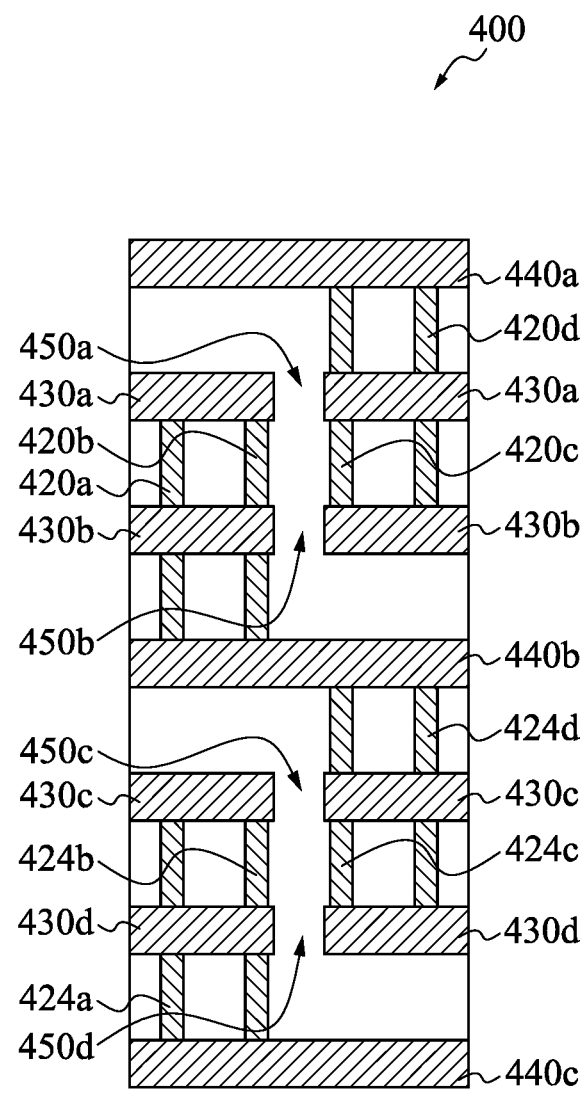
FIG. 6 to FIG. 9 are top views of cell layouts according to different embodiments of the disclosure.

FIG. 6 is a top view of a cell layout according to some embodiments of the present disclosure. The difference between FIG. 6 and FIG. 5A includes the arrangement of the P-type active regions 420a-420d and the N-type active regions 424a-424d. The P-type active regions 420a and 420b are partially covered by the dummy gate electrode 440b while being spaced from the dummy gate electrode 440a. The P-type active regions 420c and 420d are partially covered by the dummy gate electrode 440a while being spaced from the dummy gate electrode 440b. The N-type active regions 424a and 424b are partially covered by the dummy gate electrode 440c while being spaced from the dummy gate electrode 440b. The N-type active regions 424c and 424d are partially covered by the dummy gate electrode 440b while being spaced from the dummy gate electrode 440c.

Similarly, the interconnection among the P-type active regions 420a-420d, the N-type active regions 424a-424d, and the gate electrodes 430a-430d may be similar to that shown in FIG. 5B and therefore is not repeated here to avoid duplicity.

Figure 7:
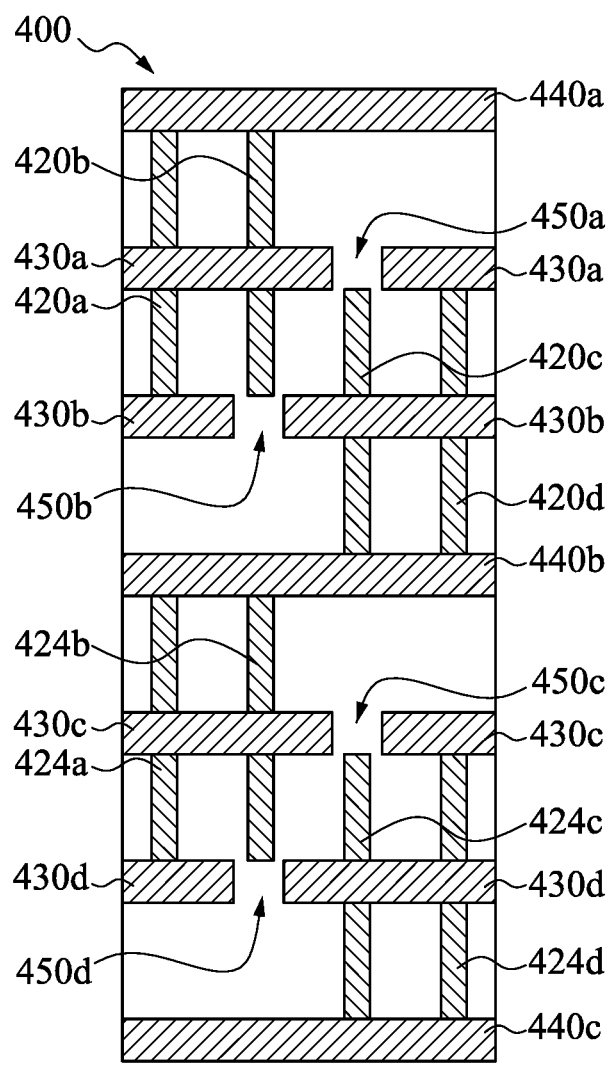

FIG. 7 is a top view of a cell layout according to some embodiments of the present disclosure. The difference between FIG. 7 and FIG. 5A includes the arrangement of the P-type active regions 420a-420d, the N-type active regions 424a-424d, the gate electrodes 430a-430d, and the cutting patterns 450a-450d. In FIG. 7, the edge of each of the P-type active regions 420a and 420b distal to the dummy gate electrode 440a is not covered by the gate electrode 430b; the edge of each of the P-type active regions 420c and 420d distal to the dummy gate electrode 440b is not covered by the gate electrode 430a; the edge of each of the N-type active regions 424a and 424b distal to the dummy gate electrode 440b is not covered by the gate electrode 430d; and the edge of each of the N-type active regions 424c and 424d distal to the dummy gate electrode 440c is not covered by the gate electrode 430c. That is, the cell layout of FIG. 7 represents a non-PODE configuration, in which each of the gate electrodes 430a-430d has no portion arranged to act as a PODE structure. In some embodiments, each or at least one of the cutting patterns 450a-450d in the non-PODE configuration may be substantially aligned with at least one of the active regions 420a-420d and 424a-424d. For example, the cutting pattern 450a may be substantially aligned with the P-type active region 420c; the cutting pattern 450b may be substantially aligned with the P-type active region 420b; the cutting pattern 450c may be substantially aligned with the N-type active region 424c; and the cutting pattern 450d may be substantially aligned with the N-type active region 424b. In some alternative embodiments, the cutting patterns 450a-450d in the non-PODE configuration may be similar to that shown in FIG. 5A as well, in which each or at least one of the cutting patterns 450a-450d is present between adjacent two of the active regions 420a-420d and 424a-424d.

The interconnection among the P-type active regions 420a-420d, the N-type active regions 424a-424d, and the gate electrodes 430a-430d may be similar to that shown in FIG. 5B and therefore is not repeated here to avoid duplicity.

Figure 8:
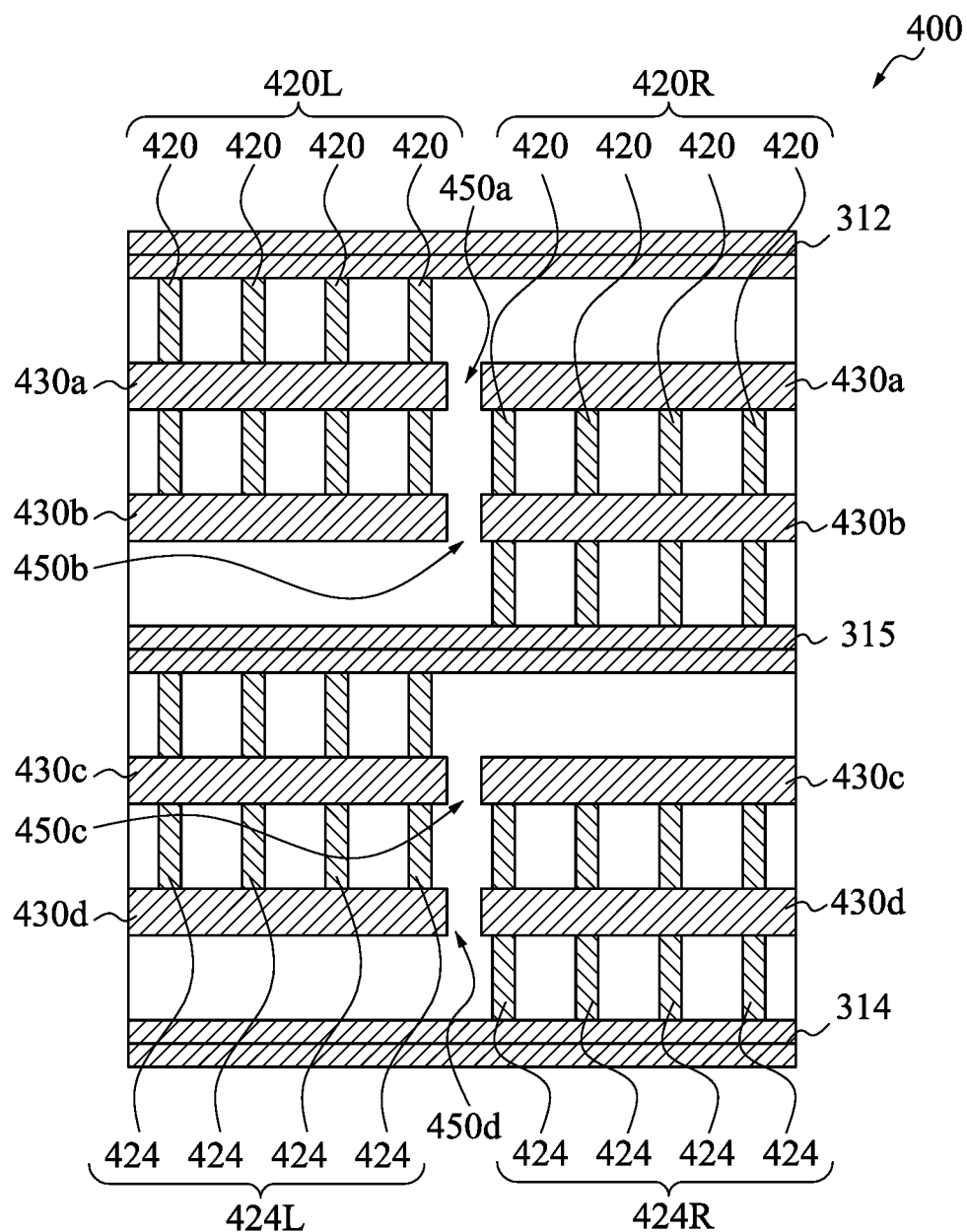

In some embodiments, as shown in FIG. 8, the cell 400 has eight P-type active regions 420 and eight N-type active regions 424. The P-type active regions 420 are divided into two groups 420L and 420R. The P-type active regions 420 in the same group 420L or 420R are substantially aligned with each other, while the groups 420L and 420R are staggered. The P-type active regions 420 in the group 420L are closer to the top edge 312, and the P-type active regions 420 in the group 420R are closer to the common boundary line 315. Similarly, the N-type active regions 424 are divided into two groups 424L and 424R as well. The N-type active regions 424 in the same group 424L or 424R are substantially aligned with each other, while the groups 424L and 424R are staggered. The N-type active regions 424 in the group 424L are closer to the common boundary line 315, and the N-type active regions 424 in the group 420R are closer to the bottom edge 314.

Figure 9:
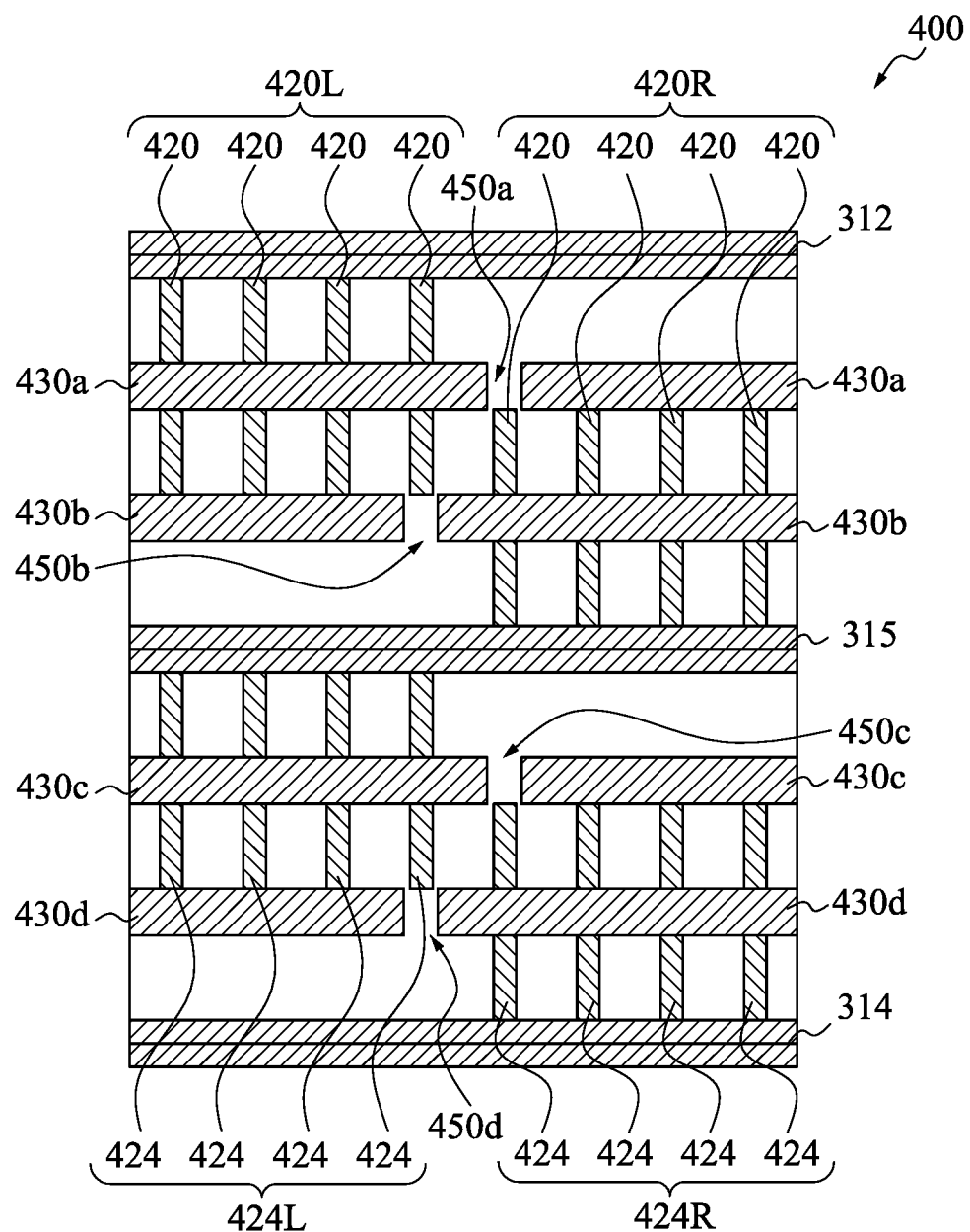

In some embodiments, as shown in FIG. 8, each of the cutting patterns 450a-450d may be present between adjacent two of the active regions 420 and 424. On the other hand, in a non-PODE configuration, in which each of the gate electrodes 430a-430d has no portion arranged to act as a PODE structure, as shown in FIG. 9, each of the cutting patterns 450a-450d may be substantially aligned with at least one of the active regions 420 and 424. In some alternative embodiments, the cutting patterns 450a-450d in the non-PODE configuration may be similar to that shown in FIG. 8 as well, in which each or at least one of the cutting patterns 450a-450d are present between adjacent two of the active regions 420 and 424.

The interconnection among the P-type active regions 420, the N-type active regions 424, and the gate electrodes 430a-430d may be similar to that shown in FIG. 5B and therefore is not repeated here to avoid duplicity.

Figure 10:
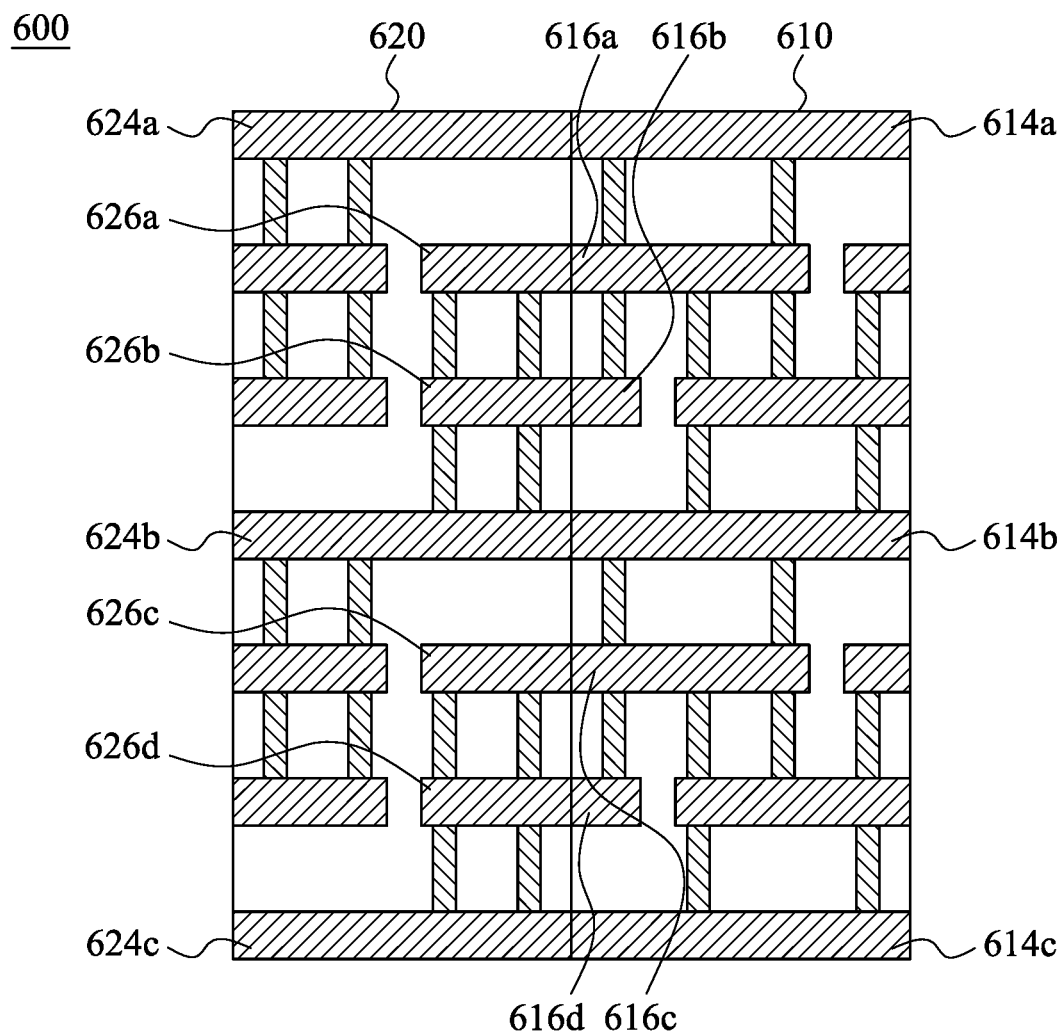
FIG. 10 to FIG. 13 are top views of integrated circuit layouts according to different embodiments of the disclosure.

Reference is made to FIG. 10, which is a top view of an integrated circuit layout according to some embodiments of the present disclosure. The layout 600 includes at least one first cell 610 and at least one second cell 620. The first cell 610 is a cell having active regions staggered in a one-by-one configuration, such as but not limited to the cells 200 shown in FIGS. 2A, 3 and 4. The second cell 620 is a cell having active regions staggered in groups, such as but not limited to the cells 400 shown in FIGS. 5A, and 6-9.

The cell heights of the first cell 610 and the second cell 620 are substantially the same, which enables the first cell 610 and the second cell 620 to be placed in a row. The first cell 610 has high device density since the devices of the first cell 610 can be more staggered, and the first cell 610 can be small in size. On the other hand, the devices of the second cell 620 can be used to build a complicated circuit. Furthermore, the devices of the second cell 620 have less or no PODE structure on their gate electrodes, and thus the devices of the second cell 620 will have high device performance and low power consumption. For example, as shown in FIG. 6, a part of the gate electrode 430a that crosses the P-type active regions 420c and 420d has no portion arranged to act as a PODE structure, and thus the device performance and the power consumption of the FinFET formed by the P-type active regions 420c and 420d and the gate electrode 430a will not be affected by the PODE structure. As shown in FIG. 10, by abutting the first cell 610 and the second cell 620 in the row, the designer will have the freedom to design the arrangement of devices.

In some embodiments, at least one of gate electrodes 616a-616d of the first cell 610 and at least one of gate electrodes 626a-626d of the second cell 620 are physically connected to each other. As shown in FIG. 10, the gate electrode 616a of the first cell 610 is physically connected to the gate electrode 626a of the second cell 620; the gate electrode 616b of the first cell 610 is physically connected to the gate electrode 626b of the second cell 620; the gate electrode 616c of the first cell 610 is physically connected to the gate electrode 626c of the second cell 620; and the gate electrode 616d of the first cell 610 is physically connected to the gate electrode 626d of the second cell 620.

Furthermore, dummy gate electrodes 614a-614c of the first cell 610 and dummy gate electrodes 624a-624c of the second cell 620 extend substantially along a longitudinal direction of the row. When the first cell 610 and the second cell 620 are abutted in the row, the dummy gate electrodes 614a-614c of the first cell 610 and the dummy gate electrodes 624a-624c of the second cell 620 at the same horizontal level are physically connected to each other. For example, the dummy gate electrode 614a of the first cell 610 and the dummy gate electrode 624a of the second cell 620 are physically connected to each other; the dummy gate electrode 614b of the first cell 610 and the dummy gate electrode 624b of the second cell 620 are physically connected to each other; and the dummy gate electrode 614c of the first cell 610 and the dummy gate electrode 624c of the second cell 620 are physically connected to each other.

Since the dummy gate electrodes 614a-614c of the first cell 610 and the dummy gate electrodes 624a-624c of the second cell 620 are conductive, the continuous dummy gate electrodes 614a-614c and 624a-624c can be utilized for interconnecting the first cell 610 and the second cell 620. That is, some signals may travel through the dummy gate electrodes 614a-614c and 624a-624c rather than through a metal one line or a metal two line. Therefore, an amount of metal one lines and/or metal two lines for interconnecting the first cell 610 and the second cell 620 can be reduced.

Figure 11:
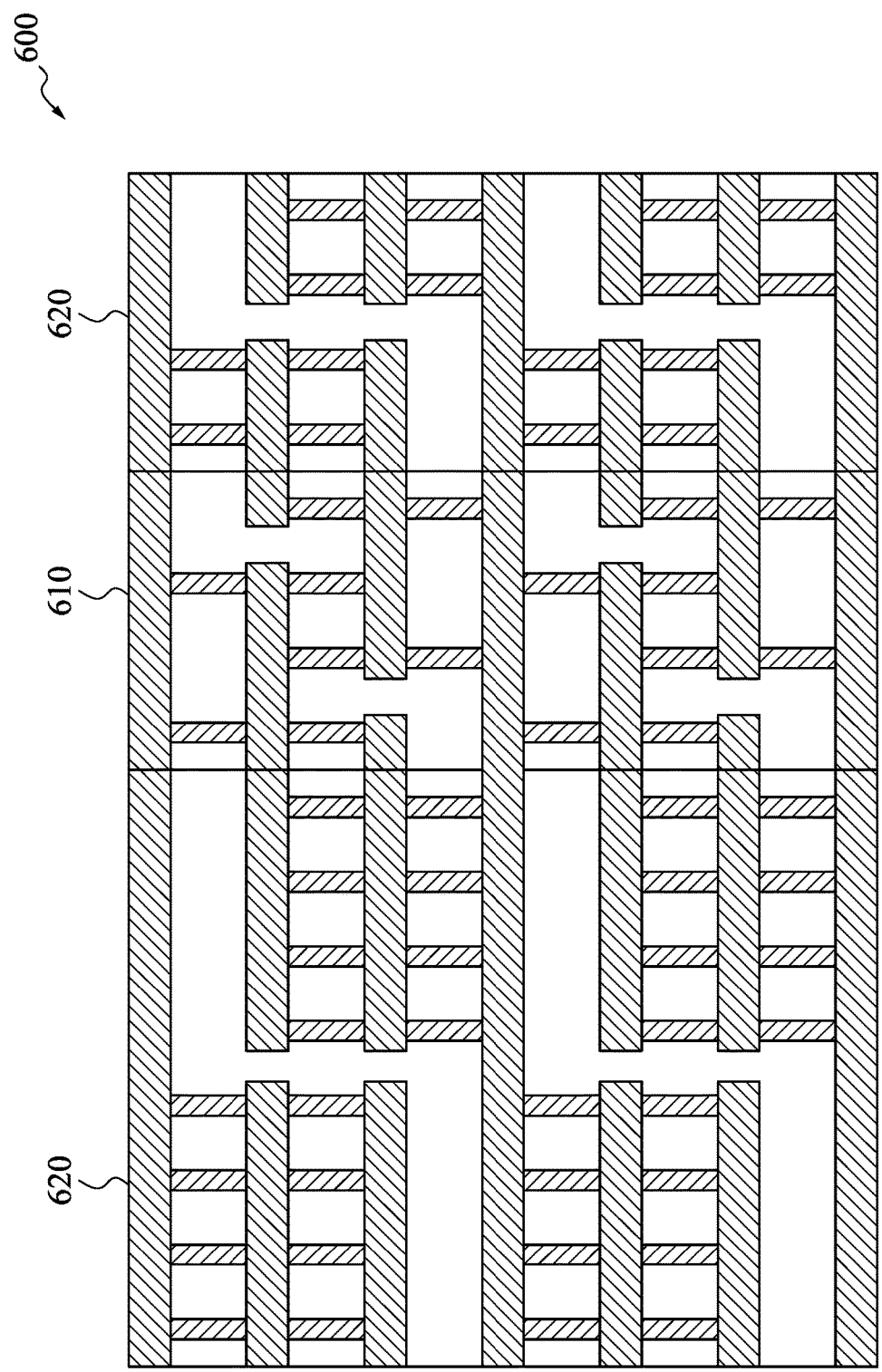
Figure 12:
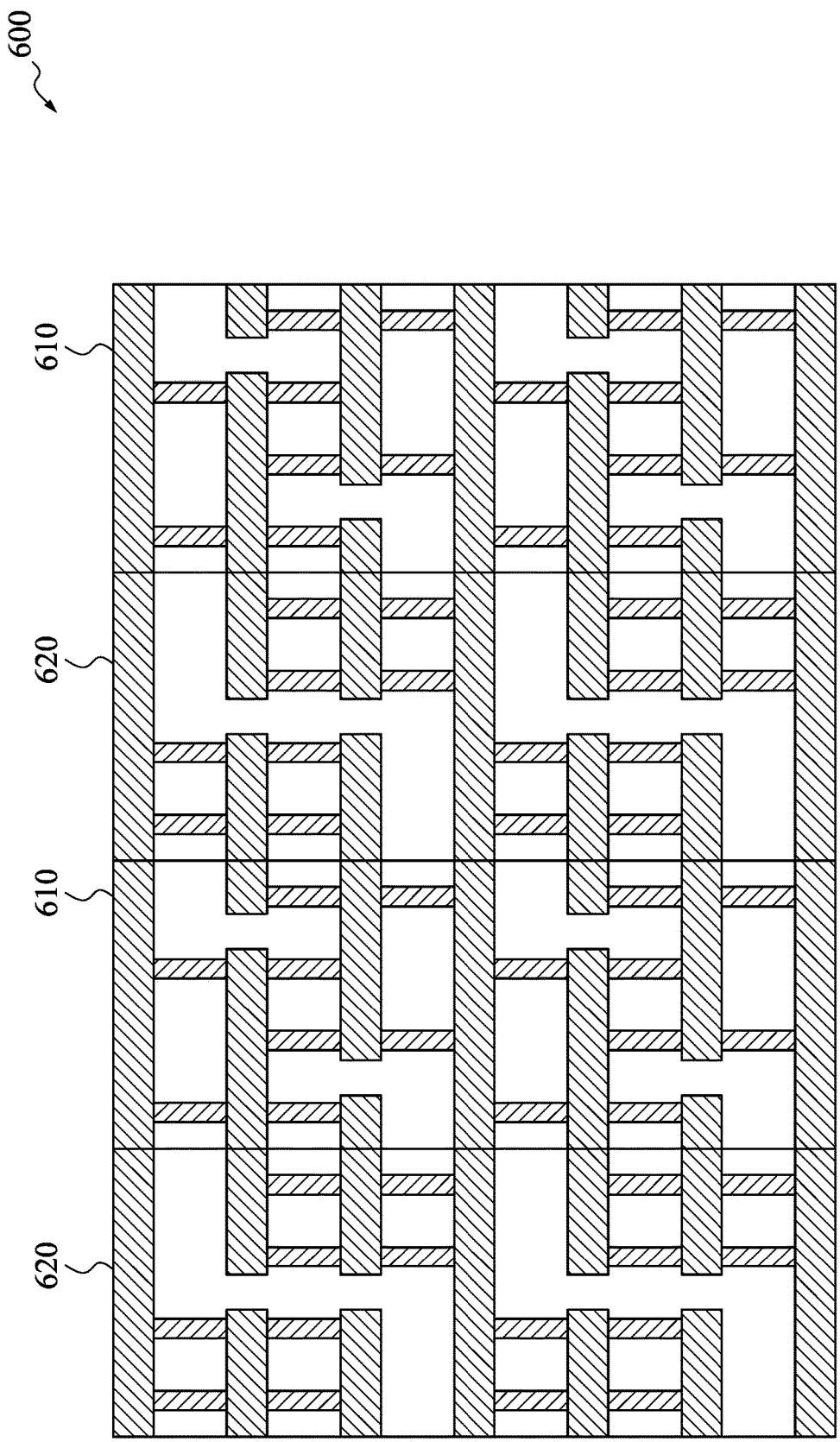
Figure 13:
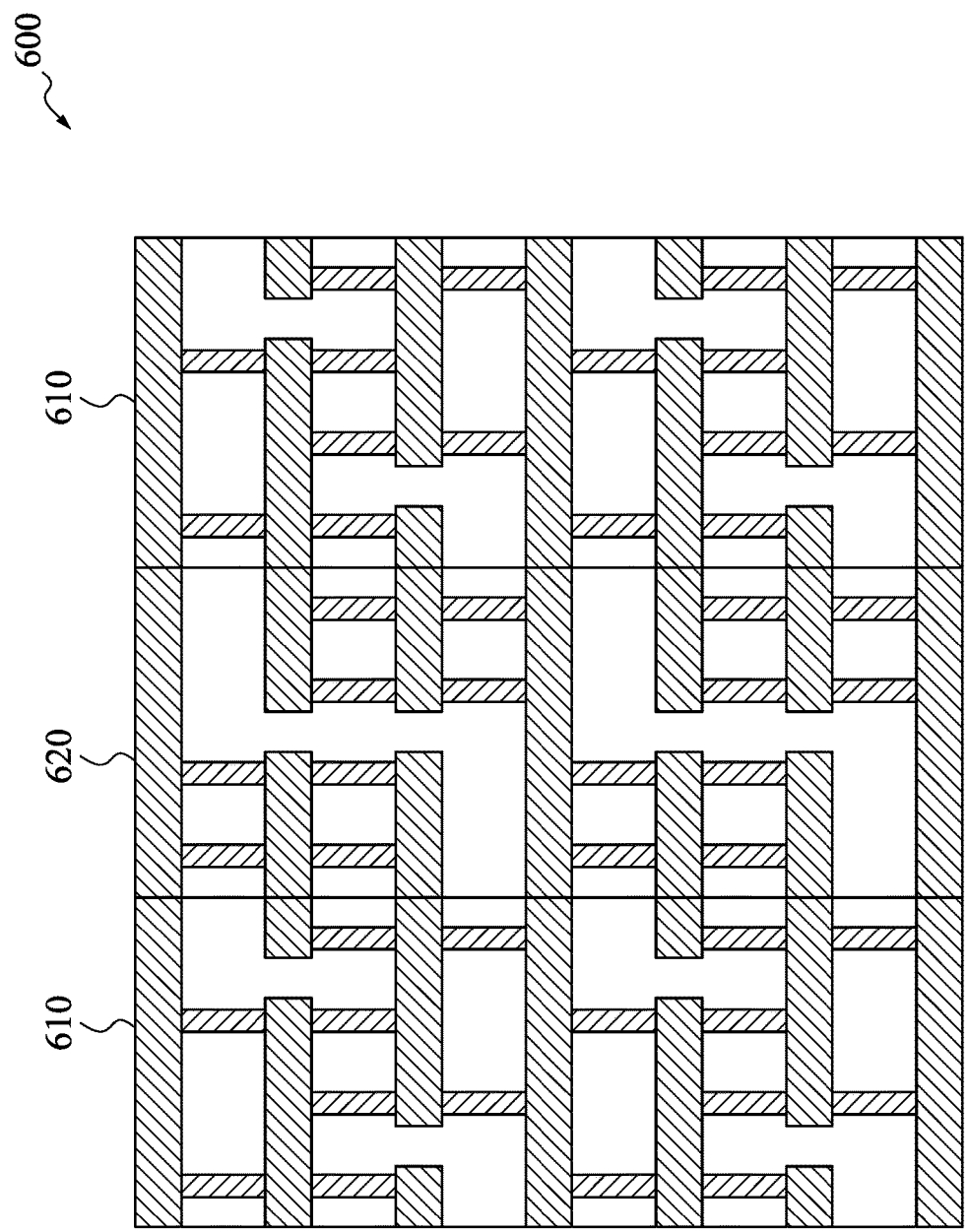

FIG. 11 to FIG. 13 are top views of integrated circuit layouts according to some embodiments of the present disclosure. The numbers, arrangement, and types of the first cell 610 and the second cell 620 may vary according to circuit design. As shown in FIG. 11, a first cell 610 is sandwiched between two second cells 620, and the second cells 620 are different from each other. As shown in FIG. 12, the first cells 610 and the second cells 620 are alternatingly arranged. As shown in FIG. 13, a second cell 620 is sandwiched between two first cells 610.

Figure 14A:
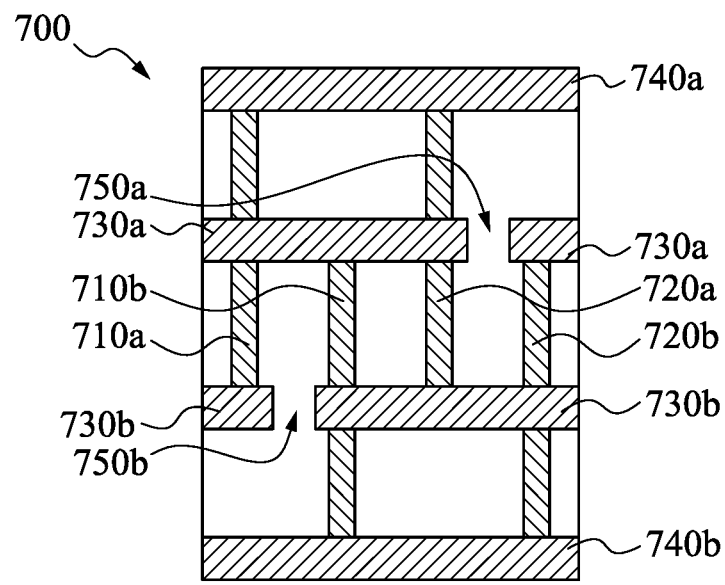
FIG. 14A is a top view of a cell layout according to some embodiments of the disclosure.

In some embodiments, the P-type active regions and the N-type active regions may be horizontally arranged in the cell. Reference is made to FIG. 14A. The cell 700 includes a plurality of P-type active regions 710a and 710b, a plurality of N-type active regions 720a and 720b, a plurality of gate electrodes 730a and 730b, and a plurality of dummy gate electrodes 740a and 740b.

The dummy gate electrodes 740a and 740b are respectively present on the top edge and the bottom edge of the cell 700. The gate electrodes 730a and 730b are present between the dummy gate electrodes 740a and 740b.

In some embodiments, the P-type active regions 710a and 710b and the N-type active regions 720a and 720b are staggered in the cell 700. For example, the P-type active region 710a and the N-type active region 720a are partially covered by the dummy gate electrode 740a while being spaced from the dummy gate electrode 740b. The P-type active region 710b and the N-type active region 720b are partially covered by the dummy gate electrode 740b while being spaced from the dummy gate electrode 740a. The P-type active region 710b is present between the P-type active region 710a and the N-type active region 720a, and the N-type active region 720a is present between the P-type active regions 710b and the N-type active region 720b.

The cell 700 further includes a plurality of cutting patterns 750a and 750b respectively for separating the gate electrodes 730a and 730b. In some embodiments, the gate electrode 730a is separated by the cutting pattern 750a into two parts. One part of the gate electrode 730a crosses the P-type active region 710a and the N-type active region 720a and is partially present on an edge of the P-type active region 710b, in which said part of the gate electrode 730a is regarded as a dummy gate electrode to the P-type active region 710b. The other part of the gate electrode 730a is partially present on an edge of the N-type active region 720b and is regarded as a dummy gate electrode to the N-type active region 720b. The gate electrode 730b is separated by the cutting pattern 750b into two parts. One part of the gate electrode 730b crosses the P-type active region 710b and the N-type active region 720b and is partially present on an edge of the N-type active region 720a, in which said part of the gate electrode 730b is regarded as a dummy gate electrode to the N-type active region 720a. The other part of the gate electrode 730b is partially present on an edge of the P-type active region 710a and is regarded as a dummy gate electrode to the P-type active region 710a.

Figure 14B:
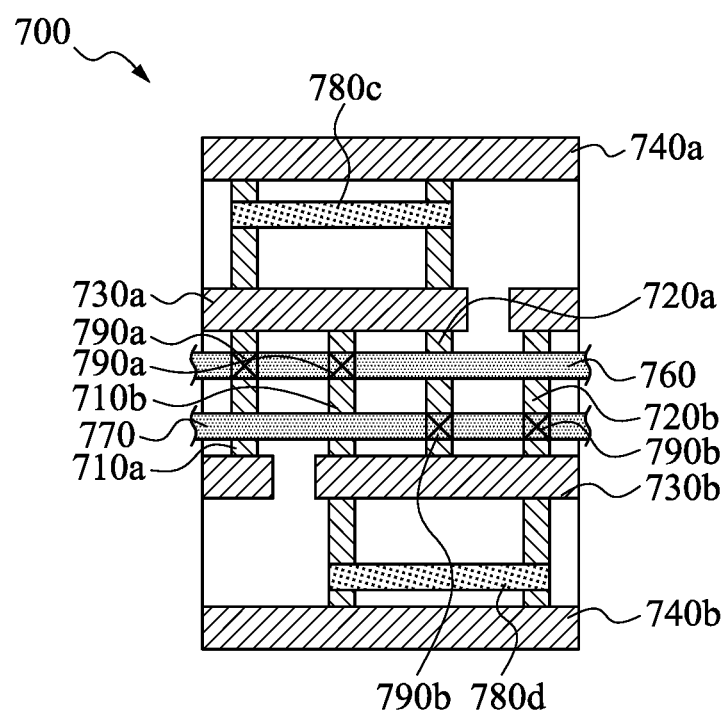
FIG. 14B is a top view of an integrated circuit layout using the cell of FIG. 14A according to some embodiments of the disclosure.

Reference is made to FIG. 14B, which is a top view of an integrated circuit layout using the cell 700 of FIG. 14A according to some embodiments of the present disclosure. In some embodiments, the cell 700 is arranged to form two inverters. One of the inverters includes the P-type active region 710a, the N-type active region 720a, and the gate electrode 730a, and the other inverter includes the P-type active region 710b, the N-type active region 720b, and the gate electrode 730b.

A VDD power supply line 760 and a VSS ground line 770 are implemented, for example, in metal one lines. The VDD power supply line 760 is connected through conductive via zeros 790a to each of source regions of the P-type active regions 710a and 710b. Similarly, the VSS ground line 770 is connected through conductive via zeros 790b to each of source regions of the N-type active regions 720a and 720b.

In some embodiments, drain regions of the P-type active region 710a and the N-type active region 720a are interconnected through a local conductive metal segment 780c. Similarly, drain regions of the P-type active regions 710b and the N-type active region 720b are interconnected through a local conductive metal segment 780d. Output ports of the inverters are respectively on or electrically connected to the local conductive metal segments 780c and 780d. Input ports of the inverters are respectively on or electrically connected to a part of the gate electrode 730a that crosses the P-type active region 710a and the N-type active region 720a and a part of the gate electrode 730b that crosses the P-type active region 710b and the N-type active region 720b.

Figure 15:
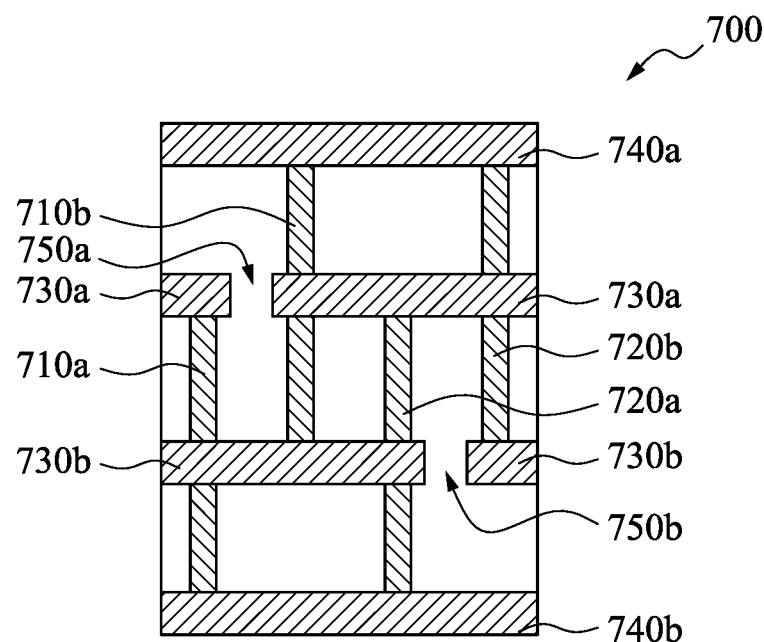
FIG. 15 and FIG. 16 are top views of cell layouts according to some embodiments of the disclosure.

FIG. 15 is a top view of a cell layout according to some embodiments of the present disclosure. The difference between FIG. 15 and FIG. 14A includes the arrangement of the P-type active regions 710a and 710b, the N-type active regions 720a and 720b, and the cutting patterns 750a and 750b. Referring to FIG. 15, the P-type active region 710a and the N-type active region 720a are partially covered by the dummy gate electrode 740b while being spaced from the dummy gate electrode 740a. The P-type active region 710b and the N-type active region 720b are partially covered by the dummy gate electrode 740a while being spaced from the dummy gate electrode 740b. The cutting pattern 750a for separating the gate electrode 730a is present between the P-type active regions 710a and 710b. The cutting pattern 750b for separating the gate electrode 730b is present between the N-type active regions 720a and 720b.

The interconnection among the P-type active regions 710a and 710b, the N-type active regions 720a and 720b, and the gate electrodes 730a and 730b may be similar to that shown in FIG. 14B and therefore is not repeated here to avoid duplicity.

Figure 16:
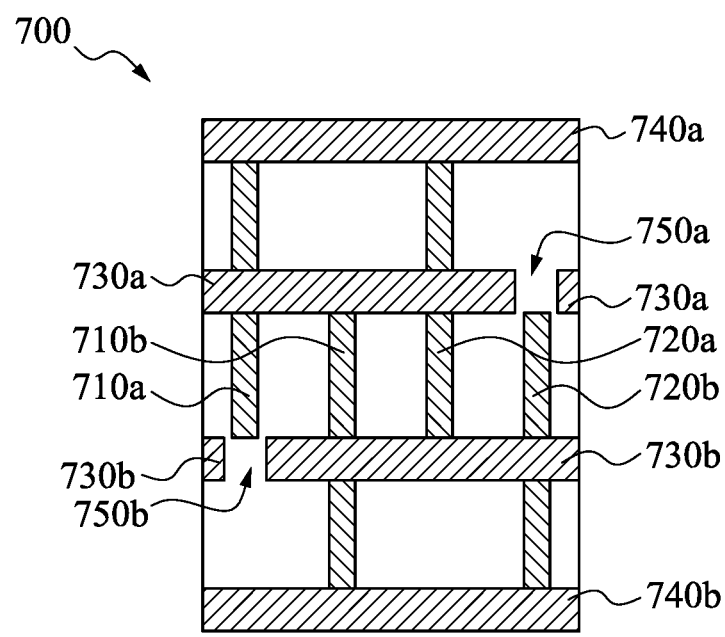

FIG. 16 is a top view of a cell layout according to some embodiments of the present disclosure. The difference between FIG. 16 and FIG. 14A includes the arrangement of the P-type active regions 710a and 710b, the N-type active regions 720a and 720b, the gate electrodes 730a-730b and the cutting patterns 750a and 750d. Referring to FIG. 16, the edge of each of the P-type active region 710a and the N-type active region 720a distal to the dummy gate electrode 740a is not covered by the gate electrode 730b, and the edge of each of the P-type active region 710b and the N-type active region 720b distal to the dummy gate electrode 740b is not covered by the gate electrode 730a. That is, the cell layout of FIG. 16 represents a non-PODE configuration, in which each of the gate electrodes 730a and 730b has no portion arranged to act as a PODE structure. In some embodiments, each or at least one of the cutting patterns 750a and 750b in the non-PODE configuration may be substantially aligned with at least one of the active regions 710a-710b and 720a-720b. For example, the cutting pattern 750a may be substantially aligned with the N-type active region 720b, and the cutting pattern 750b may be substantially aligned with the P-type active region 710a. In some alternative embodiments, the cutting patterns 750a and 750b in the non-PODE configuration may be similar to that shown in FIG. 14A as well, in which each or at least one of the cutting patterns 750a and 750b is present between adjacent two of the active regions 710a-710b and 720a-720b.

The interconnection among the P-type active regions 710a and 710b, the N-type active regions 720a and 720b, and the gate electrodes 730a and 730b may be similar to that shown in FIG. 14B and therefore is not repeated here to avoid duplicity.

Figure 17A:
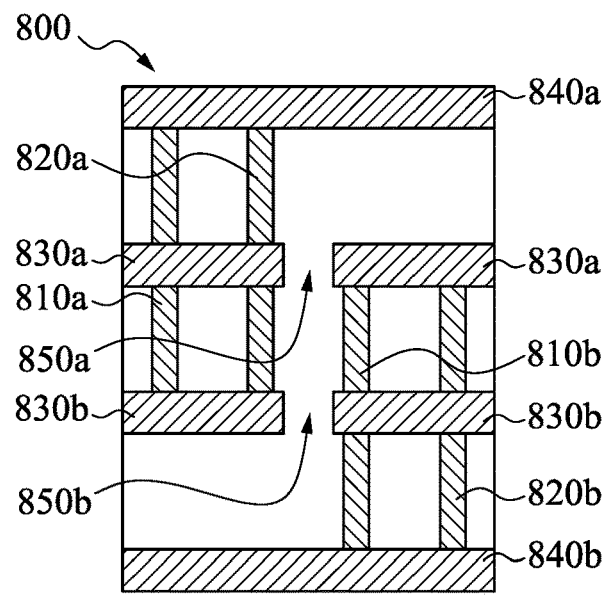
FIG. 17A is a top view of a cell layout according to some embodiments of the disclosure.

Reference is made to FIG. 17A. Unlike the cells 700 having the active regions 710a-710b and 720a-720b staggered in the one-by-one configuration shown in FIGS. 14A, 15 and 16, the active regions 810a-810b and 820a-820b of the cell 800 are staggered in groups, in which the active regions 810a-810b and 820a-820b of each group are substantially aligned with each other, and the active regions 810a-810b and 820a-820b of adjacent groups are not aligned. Referring to FIG. 17A, the P-type active region 810a and the N-type active region 820a are partially covered by the dummy gate electrode 840a while being spaced from the dummy gate electrode 840b. The P-type active region 810b and the N-type active region 820b are partially covered by the dummy gate electrode 840b while being spaced from the dummy gate electrode 840a.

The gate electrode 830a is separated by the cutting pattern 850a into two parts. One part of the gate electrode 830a crosses the P-type active region 810a and the N-type active region 820a. The other part of the gate electrode 830a is partially present on edges of the P-type active region 810b and the N-type active region 820b and is regarded as a dummy gate electrode to the P-type active region 810b and the N-type active region 820b. The gate electrode 830b is separated by the cutting pattern 850b into two parts. One part of the gate electrode 830b crosses the P-type active region 810b and the N-type active region 820b. The other part of the gate electrode 830b is partially present on edges of the P-type active region 810a and the N-type active region 820a and is regarded as a dummy gate electrode to the P-type active region 810a and the N-type active region 820a.

Figure 17B:
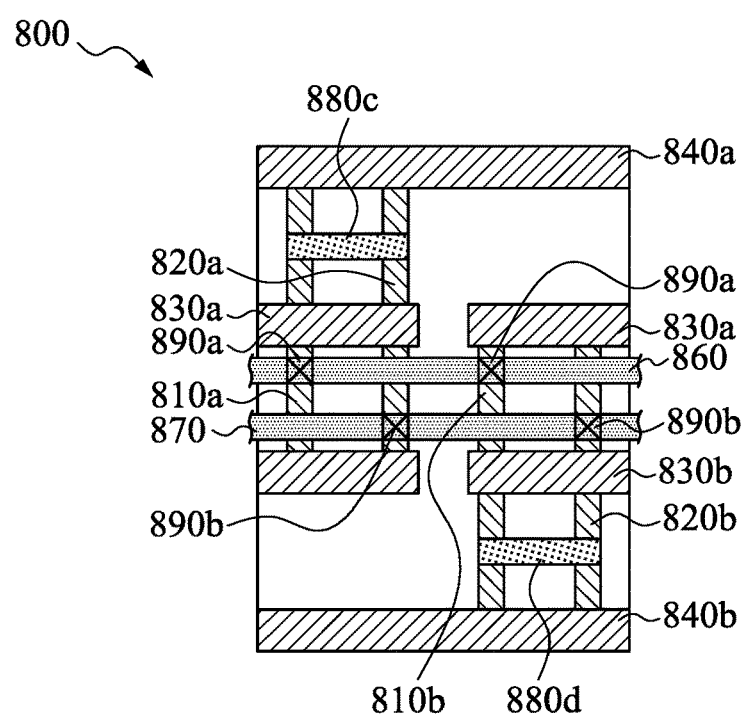
FIG. 17B is top view of an integrated circuit layout using the cell of FIG. 17A according to some embodiments of the disclosure.

Reference is made to FIG. 17B, which is a top view of an integrated circuit layout using the cell 800 of FIG. 17A according to some embodiments of the present disclosure. In some embodiments, the cell 800 is arranged to form two inverters. One of the inverters includes the P-type active region 810a, the N-type active region 820a, and the gate electrode 830a, and the other inverter includes the P-type active region 810b, the N-type active region 820b, and the gate electrode 830b.

A VDD power supply line 860 and a VSS ground line 870 are implemented, for example, in metal one lines. The VDD power supply line 860 is connected through conductive via zeros 890*a* to each of source regions of the P-type active regions 810*a* and 810*b*. Similarly, the VSS ground line 870 is connected through conductive via zeros 890*b* to each of source regions of the N-type active regions 820*a* and 820*b*.

In some embodiments, drain regions of the P-type active region 810*a* and the N-type active region 820*a* are interconnected through a local conductive metal segment 880*c*. Similarly, drain regions of the P-type active region 810*b* and the N-type active region 820*b* are interconnected through a local conductive metal segment 880*d*. Output ports of the inverters are respectively on or electrically connected to the local conductive metal segments 880*c* and 880*d*. Input ports of the inverters are respectively on or electrically connected to a part of the gate electrode 830*a* that crosses the P-type active region 810*a* and the N-type active region 820*a* and a part of the gate electrode 830*b* that crosses the P-type active region 810*b* and the N-type active region 820*b*.

Figure 18:
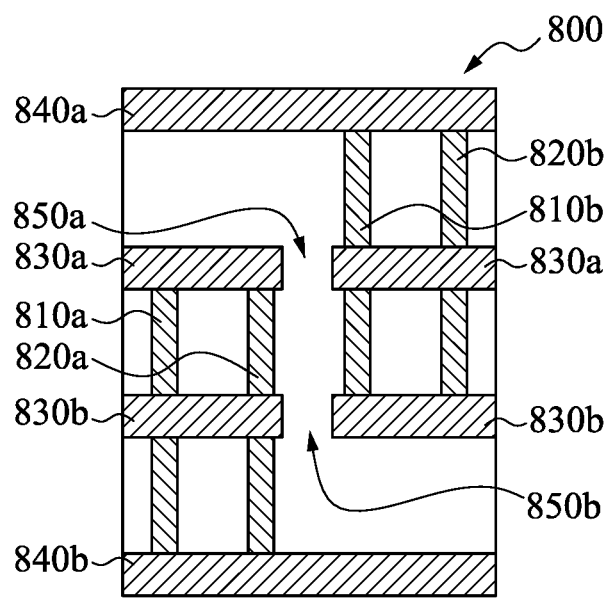
FIG. 18 and FIG. 19 are top views of cell layouts according to some embodiments of the disclosure.

FIG. 18 is a top view of a cell layout according to some embodiments of the present disclosure. The difference between FIG. 18 and FIG. 17A includes the arrangement of the P-type active regions 810*a* and 810*b* and the N-type active regions 820*a* and 820*b*. Referring to FIG. 18, the P-type active region 810*a* and the N-type active region 820*a* are partially covered by the dummy gate electrode 840*b* while being spaced from the dummy gate electrode 840*a*. The P-type active region 810*b* and the N-type active region 820*b* are partially covered by the dummy gate electrode 840*a* while being spaced from the dummy gate electrode 840*b*.

Similarly, the interconnection among the P-type active regions 810*a* and 810*b*, the N-type active regions 820*a* and 820*b*, and the gate electrodes 830*a* and 830*b* may be similar to that shown in FIG. 17B and therefore is not repeated here to avoid duplicity.

Figure 19:
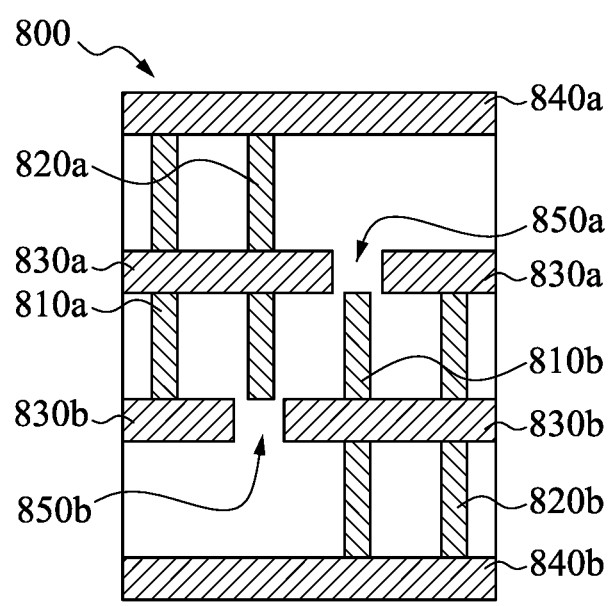

FIG. 19 is a top view of a cell layout according to some embodiments of the present disclosure. The difference between FIG. 19 and FIG. 17A includes the arrangement of the P-type active regions 810*a* and 810*b*, the N-type active regions 820*a* and 820*b*, the gate electrodes 830*a* and 830*b* and the cutting patterns 850*a* and 850*b*. Referring to FIG. 19, the edge of each of the P-type active region 810*a* and the N-type active region 820*a* distal to the dummy gate electrode 840*a* is not covered by the gate electrode 830*b*, and the edge of each of the P-type active region 810*b* and the N-type active region 820*b* distal to the dummy gate electrode 840*b* is not covered by the gate electrode 830*a*. That is, the cell layout of FIG. 19 represents a non-PODE configuration, in which each of the gate electrodes 830*a* and 830*b* has no portion arranged to act as a PODE structure. In some embodiments, each or at least one of the cutting patterns 850*a* and 850*b* in the non-PODE configuration may be substantially aligned with at least one of the active regions 810*a*-810*b* and 820*a*-820*b*. For example, the cutting pattern 850*a* may be substantially aligned with the P-type active region 810*b*, and the cutting pattern 850*b* may be substantially aligned with the N-type active region 820*a*. In some alternative embodiments, the cutting patterns 850*a* and 850*b* in the non-PODE configuration may be similar to that shown in FIG. 17A as well, in which each or at least one of the cutting patterns 850*a* and 850*b* is present between adjacent two of the active regions 810*a*-810*b* and 820*a*-820*b*.

The interconnection among the P-type active regions 810*a* and 810*b*, the N-type active regions 820*a* and 820*b*, and the gate electrodes 830*a* and 830*b* may be similar to that shown in FIG. 17B and therefore is not repeated here to avoid duplicity.

Figure 20:
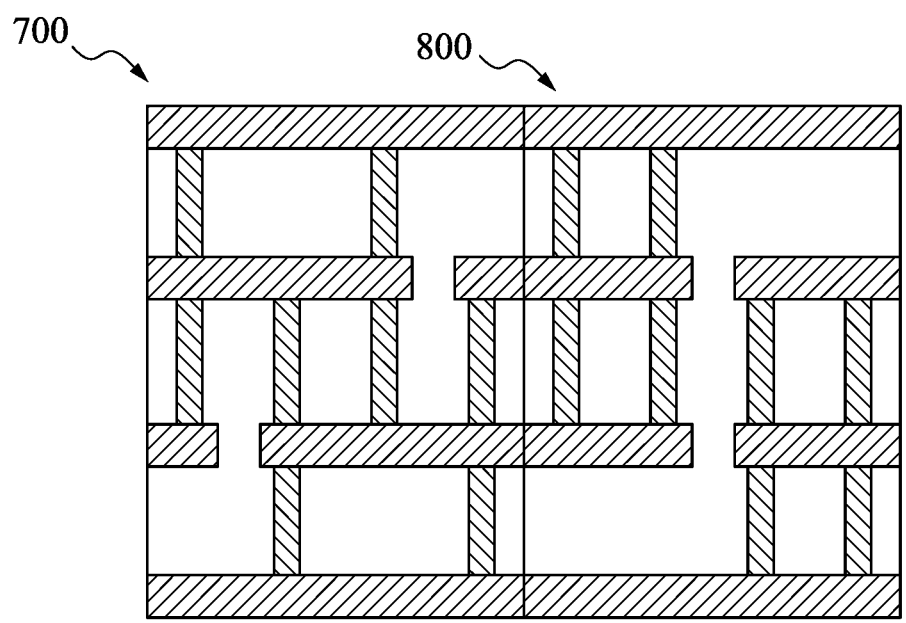
FIG. 20 is a top view of an integrated circuit layout according some embodiments of the disclosure.

Reference is made to FIG. 20. The cell 700 and the cell 800 can be abutted in a row, in which the cell 700 is a cell having active regions staggered in a one-by-one configuration, such as but not limited to the cells 700 shown in FIGS. 14A, 15 and 16, and the cell 800 is a cell having active regions staggered in groups, such as but not limited to the cells 400 shown in FIGS. 17A, 18, and 19.

The cell heights of the cell 700 and the cell 800 are substantially the same, which enables the cell 700 and the cell 800 to be placed in a row. The cell 700 has high device density since the devices of the cell 700 can be more staggered, and the cell 700 can be small in size. On the other hand, the devices of the cell 800 can be used to build a complicated circuit and will have high device performance and low power consumption since the devices of the cell 800 have less or no PODE structure on their gate electrodes. As shown in FIG. 20, by abutting the cell 700 and the cell 800 in the row, the designer will have the freedom to design the arrangement of devices. Furthermore, at least one of the dummy gate electrodes of the cell 700 and at least one of the dummy gate electrodes of the cell 800 are physically connected, thus the conductive and continuous dummy gate electrodes can be utilized for interconnecting the cell 700 and the cell 800.

Figure 21:
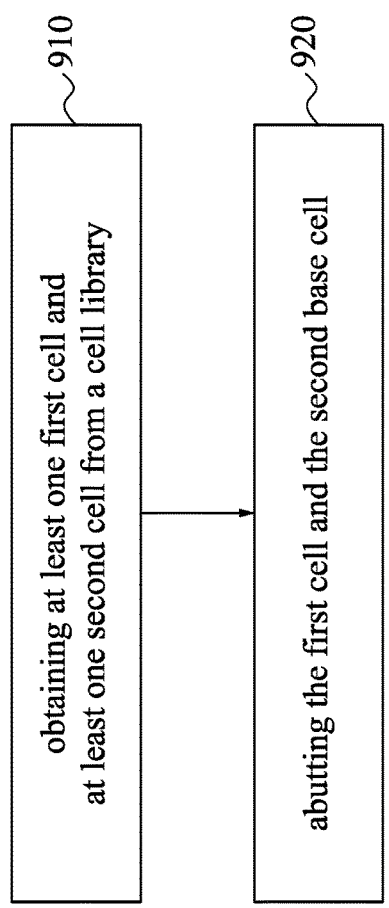
FIG. 21 is a flowchart of a method of configuring an integrated circuit layout according to some embodiments of the disclosure.

Reference is made to FIG. 21, which is a flowchart of a method of configuring an integrated circuit layout according to some embodiments of the present disclosure. In the design of an integrated circuit, various cells having predetermined functions are used, and the layouts of cells are stored in, for example, at least one cell library. The method begins at operation 910, in which at least one first cell having active regions staggered in a one-by-one configuration, such as but not limited to the cells shown in FIGS. 2A, 3, 4, 14A, 15 and 16, and at least one second cell having active regions staggered in groups, such as but not limited to the cells shown in FIGS. 5A, 6-9, 17A, 18, and 19, are obtained from the cell library. The method goes to operation 920, in which the first cell and the second cell are placed into one or more desired locations on an integrated circuit layout and are abutted in at least one row.

Figure 22:
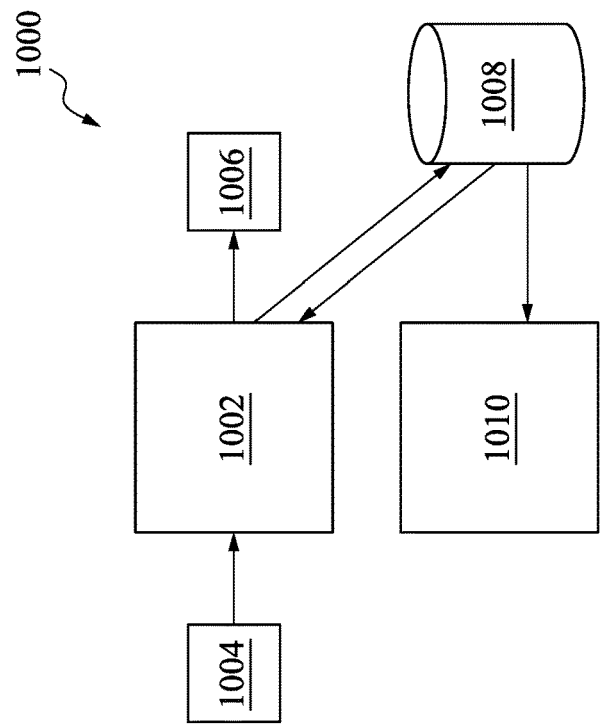
FIG. 22 is a processing system to generate one or more of the above described layout embodiments.

FIG. 22 illustrates a processing system 1000 wherein the above described method may be implemented in order to generate one or more of the above described layout embodiments. The processing system 1000 includes a processor 1002, which may include a central processing unit, an input/output circuitry, a signal processing circuitry, and a volatile and/or a non-volatile memory. The processor 1002 receives input, such as user input, from an input device 1004. The input device 1004 may include one or more of a keyboard, a mouse, a tablet, a contact sensitive surface, a stylus, a microphone, and the like. The processor 1002 may also receive input, such as standard cell layouts, cell libraries, models, and the like, from a non-transitory machine readable storage medium 1008. The non-transitory machine readable storage medium 1008 may be located locally to the processor 1002, or may be remote from the processor 1002, in which communications between the processor 1002 and the non-transitory machine readable storage medium 1008 occur over a network, such as a telephone network, the Internet, a local area network, a wide area network, or the like. The non-transitory machine readable storage medium 1008 may include one or more of a hard disk, magnetic storage, optical storage, non-volatile memory storage, and the like. Included in the non-transitory machine readable storage medium 1008 may be database software for organizing data and instructions stored on the non-transitory machine readable storage medium 1008. The processing system 1000 may include an output device 1006, such as one or more of a display device, speaker, and the like, for outputting information to a user. As described above, the processor 1002 generates a layout for an integrated circuit. The layout may be stored in the non-transitory machine readable storage medium 1008. One or more integrated circuit manufacturing machines, such as a photomask generator 1010, may communicate with the non-transitory machine readable storage medium 1008, either locally or over a network, either directly or via an intermediate processor, such as the processor 1002. In some embodiments, the photomask generator 1010 generates one or more photomasks to be used in the manufacture of an integrated circuit, in conformance with a layout stored in the non-transitory machine readable storage medium 1008.

By abutting a first cell having active regions staggered in a one-by-one configuration and a second cell having active regions staggered in groups in a row, the designer will have the freedom to dispose different devices adjacent to each other. Therefore, the devices with various sizes, performances, channel widths, or the like may be put together to build an integrated circuit.

According to some embodiments of the disclosure, an integrated circuit includes at least one first active region, at least one second active region adjacent to the first active region, and a plurality of third active regions. The first active region and the second active region are staggered. The third active regions are present adjacent to the first active region, wherein the third active regions are substantially aligned with each other.

According to some embodiments of the disclosure, an integrated circuit includes a first cell and a second cell. The first cell includes a first active region, a first gate electrode crossing the first active region, a second active region adjacent to the first active region, and a second gate electrode crossing the second active region. The second cell includes a plurality of third active regions adjacent to each other, and a third gate electrode crossing the third active regions, in which the first cell and the second cell abut each other.

According to some embodiments of the disclosure, a method of configuring an integrated circuit layout using a processor includes using the processor to generate a first cell and a second cell, in which the first cell includes at least one first active region and at least one second active region arranged therein, and the second cell includes a plurality of third active regions substantially aligned with each other. The first active region and the second active region are adjacent to each other but are not aligned. The processor abuts the first cell and the second cell on the integrated circuit layout. A set of instructions are generated for manufacturing an integrated circuit based upon the integrated circuit layout, and the set of instructions are stored in an non-transitory machine readable storage medium.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit comprising:
  at least one first active region, the at least one first active region having a first length in a first direction;
  at least one second active region adjacent to the first active region, the at least one second active region having the first length in the first direction, wherein the first active region and the second active region are staggered;
  a gate electrode layer, the gate electrode layer having a first portion extending in a second direction across the at least one first active region and a second portion extending in the second direction across the at least one second active region, the first and second portions being separated and physically spaced apart from one another; and
  a plurality of third active regions adjacent to the first active region, the plurality of third active regions each having the first length in the first direction, wherein the third active regions are substantially aligned with each other.

2. The integrated circuit of claim 1, further comprising:
  at least one fourth active region, wherein the second active region is present between the fourth active region and the first active region, and wherein the fourth active region has a first edge that is substantially aligned with a first edge of the first active region, when viewed in a second direction perpendicular to the first active region, and further wherein the fourth active region has a second edge that is substantially aligned with a second edge of the first active region when viewed in the second direction.

3. The integrated circuit of claim 2, further comprising:
  at least one fifth active region, wherein the fourth active region is present between the fifth active region and the second active region, and the fifth active region and the second active region have respective first edges that are substantially aligned with each other when viewed from a second direction perpendicular to the first direction and have respective second edges that are substantially aligned with each other when viewed from the second direction.

4. The integrated circuit of claim 3, further comprising:
  at least one gate electrode crossing the second active region and the fifth active region.

5. The integrated circuit of claim 4, wherein the gate electrode is partially present on an edge of the fourth active region.

6. The integrated circuit of claim 2, further comprising:
  at least one gate electrode crossing the first active region and the fourth active region.

7. The integrated circuit of claim 6, wherein the gate electrode is partially present on an edge of the second active region.

8. An integrated circuit comprising:
  a first cell comprising:
    a first active region;
    a first gate electrode crossing the first active region;
    a second active region staggered with and adjacent to the first active region; and
    a second gate electrode crossing the second active region; and
  a second cell comprising:
    a plurality of third active regions adjacent to each other and aligned with the first active region; and
    a third gate electrode, different and spaced apart from the first gate electrode and the second gate electrode, crossing the third active regions, wherein the first cell and the second cell abut each other, wherein the second gate electrode crosses the third active regions.

9. The integrated circuit of claim 8, wherein the first active region and the second active region are staggered.

10. The integrated circuit of claim 8, wherein the first gate electrode is partially present on an edge of the second active region.

11. The integrated circuit of claim 8, wherein the second cell comprises:
   a plurality of fourth active regions adjacent to each other; and
   a fourth gate electrode crossing the fourth active regions.

12. The integrated circuit of claim 11, wherein the third active regions and the fourth active regions are arranged in a staggered configuration.

13. The integrated circuit of claim 8, wherein the third active regions are substantially aligned with each other.

14. The integrated circuit of claim 8, further comprising:
   at least one dummy gate electrode is partially present on an edge of the first active region and an edge of at least one of the third active regions.

15. The integrated circuit of claim 14, wherein the dummy gate electrode is continuous at least between the first active region and said at least one of the third active regions.

16. The integrated circuit of claim 14, wherein the dummy gate electrode is conductive.

17. The integrated circuit of claim 14, wherein the first gate electrode and the second gate electrode are separated from each other.

18. An integrated circuit, comprising:
   a plurality of first cells;
   a plurality of second cells different from the first cells, wherein one second cell is between each first cell of the plurality of first cells, and further wherein each second cell has a different orientation and configuration relative respective first cells;
   each first cell having at least one first active area and at least one second active area, the at least one first active area and the at least one second active area being staggered relative to one another; and
   each second cell having at least one third active area and at least one fourth active area, the at least one third active area and the at least one fourth active area being staggered relative to one another.

19. The integrated circuit of claim 18, wherein the at least one first active area and the at least one third active area are aligned relative to another.

20. The integrated circuit of claim 18, wherein each of the at least one first active area, the at least one second active area, the at least one third active area, and the at least one fourth active area has a same length in the same direction.

* * * * *